US011971015B2

(12) United States Patent
Ma

(10) Patent No.: US 11,971,015 B2
(45) Date of Patent: Apr. 30, 2024

(54) WIND POWER GENERATOR SET, ELECTROMAGNETIC DEVICE, AND HEAT EXCHANGE OR DRYING DEVICE FOR IRON CORE

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 823 days.

(21) Appl. No.: 17/042,169

(22) PCT Filed: May 9, 2019

(86) PCT No.: PCT/CN2019/086084
§ 371 (c)(1),
(2) Date: Sep. 27, 2020

(87) PCT Pub. No.: WO2020/042662
PCT Pub. Date: Mar. 5, 2020

(65) Prior Publication Data
US 2021/0025371 A1 Jan. 28, 2021

(30) Foreign Application Priority Data

Aug. 31, 2018 (CN) .......................... 201811014787.1

(51) Int. Cl.
*F03D 80/60* (2016.01)
*F03D 9/25* (2016.01)
(Continued)

(52) U.S. Cl.
CPC ............... *F03D 80/60* (2016.05); *F03D 9/25* (2016.05); *H02K 3/24* (2013.01); *H02K 3/50* (2013.01);
(Continued)

(58) Field of Classification Search
CPC .. H02K 3/24; H02K 3/50; H02K 9/04; H02K 15/125; H02K 2203/09; H02K 9/19; H02K 9/193; H02K 9/197
See application file for complete search history.

(56) References Cited

U.S. PATENT DOCUMENTS 10,014,735 B2 * 7/2018 Ma ........................... F16J 15/54
10,666,096 B2 * 5/2020 Seo ........................ B60L 50/51
(Continued)

FOREIGN PATENT DOCUMENTS

CN 1630166 A 6/2005
CN 101711451 A 5/2010
(Continued)

OTHER PUBLICATIONS

International Search Report and Written Opinion issued in corresponding PCT Application No. PCT/CN2019/086084, dated Jul. 30, 2019, 12 pages.
(Continued)

Primary Examiner — Robert W Horn
(74) Attorney, Agent, or Firm — Bayes PLLC

(57) ABSTRACT

A wind power generator set, an electromagnetic device and a heat exchange or drying device for an iron core. The heat exchange or drying device for an iron core includes a sprayer capable of feeding an airflow, wherein the sprayer is provided with a spraying hole, and the airflow can be sprayed to an end of the iron core through the spraying hole. The sprayer sprays a cold airflow or a hot airflow at the end of the iron core, creating a cooling and drying environment at the end of the iron core. This facilitates the heat dissipation of the iron core and also the maintenance of the insulation performance of an end of a winding, including the insulation of the winding itself and the insulation between the winding and the iron core, and also the protection of a magnetic pole and a protective covering layer thereof.

18 Claims, 17 Drawing Sheets

(51) Int. Cl.
*H02K 3/24* (2006.01)
*H02K 3/50* (2006.01)
*H02K 7/18* (2006.01)
*H02K 9/04* (2006.01)
*H02K 9/08* (2006.01)
*H02K 15/12* (2006.01)

(52) U.S. Cl.
CPC ............. *H02K 7/1838* (2013.01); *H02K 9/04* (2013.01); *H02K 9/08* (2013.01); *H02K 15/125* (2013.01); *H02K 2203/09* (2013.01)

(56) References Cited

U.S. PATENT DOCUMENTS

| | | |
|---|---|---|
| 2005/0134125 A1 | 6/2005 | Kim |
| 2007/0273221 A1 | 11/2007 | Kinoshita et al. |
| 2010/0045125 A1 | 2/2010 | Takenaka et al. |
| 2010/0215526 A1 | 8/2010 | Saari et al. |
| 2014/0009015 A1 | 1/2014 | Hossain et al. |
| 2018/0019642 A1* | 1/2018 | Wang ...................... F03D 80/60 |
| 2018/0069442 A1* | 3/2018 | Ma ............................ F03D 9/25 |
| 2021/0025371 A1* | 1/2021 | Ma .......................... F03D 80/60 |

FOREIGN PATENT DOCUMENTS

| | | | |
|---|---|---|---|
| CN | 101953052 A | | 1/2011 |
| CN | 104471842 A | | 3/2015 |
| CN | 104810997 A | | 7/2015 |
| CN | 105736258 A | | 7/2016 |
| CN | 114744803 A | * | 7/2022 |
| EP | 3252930 A1 | | 12/2017 |
| JP | 2005229671 A | | 8/2005 |
| WO | WO-2020052467 A1 | * | 3/2020 ............. F03D 80/60 |

OTHER PUBLICATIONS

European Search Report in corresponding European Application No. 19855097.2 dated May 20, 2021 (16 pages).

* cited by examiner closed air supply passage

WIND POWER GENERATOR SET, ELECTROMAGNETIC DEVICE, AND HEAT EXCHANGE OR DRYING DEVICE FOR IRON CORE

CROSS-REFERENCE TO RELATED APPLICATIONS

This application is a US national phase of International Application No. PCT/CN2019/086084, filed on May 9, 2019, which claims the priority to Chinese Patent Application No. 201811014787.1, titled "WIND TURBINE, ELECTROMAGNETIC DEVICE, AND HEAT EXCHANGE DEVICE FOR IRON CORE," filed with the China National Intellectual Property Administration on Aug. 31, 2018. The entire contents of each of the above-identified applications are incorporated herein by reference.

TECHNICAL FIELD

The present application relates to the technical field of electromagnetic devices, in particular to a wind turbine, an electromagnetic device and a heat exchange or drying device for an iron core.

BACKGROUND

An iron core is an important component of a magnetic circuit, and is used in electrical components such as electric machines and transformers. Taking an electric machine as an example, a stator core, a rotor core, and an air gap between a stator and a rotor constitute the magnetic circuit of the electric machine. In an induction machine, magnetic flux in the stator core is alternating magnetic flux, and thus causing iron core loss, which is called iron loss. The iron loss includes two parts: hysteresis loss and eddy current loss. The hysteresis loss is energy loss caused by a continuous change of orientation of magnetic molecules during alternating magnetization of the iron core. The eddy current loss is resistance loss caused by the eddy current generated during the alternating magnetization of the iron core.

Both the hysteresis loss and eddy current loss are a part of the heat source of the electric machine, and another part of the heat source is generated when current flows through windings of the electric machine. From the perspective of thermodynamics and heat transfer theory, the above heat source forms the main heat source during operation of the electric machine. In addition, there is mechanical loss, including bearing friction loss, ventilation loss or dynamo brush friction loss.

Referring to FIGS. 1 and 2, FIG. 1 is a schematic view showing an overall layout of a whole generator in which an inside of the generator is cooled by a surface type heat exchanger using air as a cooling medium; FIG. 2 is an exploded schematic view showing the structure of the surface type heat exchanger in FIG. 1.

As shown in FIG. 1, a right side of a generator 500' is connected to a rotor 600', a left side of the generator 500' is provided with a nacelle 100', and a surface type heat exchanger 300' is arranged in the nacelle 100', specifically at a tail portion of the nacelle 100'. A left side of the surface type heat exchanger 300' is provided with an internal circulation induced draft fan 202', and the internal circulation induced draft fan 202' is driven by an internal circulation driving motor 201'. An internal circulation airflow drawing and conveying pipe 400' is further provided in the nacelle 100'. The hot airflow which is heated when cooling the heat generated by the generator 500' enters, under the action of the internal circulation induced draft fan 202', into a flow passage of the heat exchanger core of the surface type heat exchanger 300' through the internal circulation airflow drawing and conveying pipe 400', to perform convective heat dissipation to transfer heat to external airflow, so as to reduce its' own temperature for recycle.

An external circulation induced draft fan 102' is further provided at an external circulation airflow outlet side of the surface type heat exchanger 300', and the external circulation induced draft fan 102' is driven by an external circulation drive motor 101'. The external circulation induced draft fan 102' introduces the airflow of the natural environment into the heat exchange core of the surface type heat exchanger 300', surfaces of two sides of a core sheet of the heat exchange core are in contact with the flowing internal circulation airflow and the flowing external circulation airflow respectively, the external circulation airflow after heat absorption is discharged out of the nacelle 100' by the external circulation induced draft fan 102', and an external circulation airflow discharge port 103' connected to the outside is shown in FIG. 1. After being cooled, the internal circulation airflow is led out of the surface type heat exchanger 300', and is pressurized by the work of the rotor of the induced draft fan 102' and then diffused inside the tail portion of the nacelle 100' at 360 degrees in a direction perpendicular to the shafting.

In FIG. 2, in a case that the internal circulation airflow is introduced into the surface type heat exchanger 300', an internal circulation confluence chamber 203' is provided between the surface type heat exchanger 300' and the internal circulation airflow drawing and conveying pipe 400', and each of upper and lower end faces of the confluence chamber 203', or the side wall of the confluence chamber 203' is provided with an internal circulation airflow confluence inlet 203a'. An inlet connecting section 104' of the external circulation induced draft fan is arranged between the external circulation induced draft fan 102' and the surface type heat exchanger 300', and another inlet connecting section 204' of the internal circulation induced draft fan is provided between the internal circulation induced draft fan 202' and the surface type heat exchanger 300'.

In FIG. 1, a port is provided between an internal chamber of a housing of the generator 500' and the external cooling medium, and a cooling airflow inlet orifice plate 500a' is arranged at the port, which can be understood with reference to FIG. 3, and FIG. 3 is a schematic view showing the cooling airflow inlet orifice plate 500a' in FIG. 1.

By virtue of the internal space of the nacelle 100', the internal circulation airflow diffused in the nacelle 100' is throttled by an inlet orifice 500b' of the cooling airflow inlet orifice plate 500a' and then enters an interior of the generator 500', to be reused as cooling airflow. The cooling airflow inlet orifice plate 500a' is a throttling member, and a local flow resistance is greater by employing a non-circular orifice plate or an orifice plate having a sharp boundary as the throttling member.

With continued reference to FIGS. 4 to 7, FIG. 4 is a schematic view showing a state that windings and a ferromagnetic component of the generator are assembled; FIG. 5 is a partial schematic view showing that windings 020 in FIG. 3 are placed in open slots 010b; FIG. 6 is a schematic view showing that cooling ventilation ducts 040 radially running through the iron core of the generator are formed on the iron core of the generator; and FIG. 7 is a schematic view showing a cooling airflow flowing path in a case that the radial cooling ventilation ducts 040 between lamination plates in the stator core of the generator cooperates with the above surface type heat exchanger 300'.

The iron core of the generator includes multiple stacking sheets 010 made of a ferromagnetic material, and the stacking sheets 010 are superposed in an axial direction to finally form the iron core, and the iron core serves as a magnetically conductive component of the generator and is fastened with an iron core bracket 030. Each of the stacking sheets 010 is provided with multiple radially extending tooth portions 010a along its circumferential direction, and the open slot 010b is formed between each two of the tooth portions 010a. After the stacking sheets 010 are superposed in a certain direction, for example, in the axial direction, multiple open slots 010b are superposed in the axial direction to form a winding slot 010b' extending axially, and the winding 020 can be accommodated in the winding slot 010b'.

Large-sized and medium-sized generators mostly employ radial ventilation systems to perform heat dissipation and cooling. Specifically, a certain number of cooling ventilation ducts 040 are arranged in the stator core section. A ventilation slot sheet which forms the cooling ventilation duct 040 is formed by a fan-shaped stamping sheet, a ventilation channel steel (not shown in the figures), and a lining ring (not shown in the figures). Multiple fan-shaped stamping sheets are connected in an enclosing manner to form the annular stacking sheet 010.

Generally, the fan-shaped stamping sheet is made of a pickled steel plate having a thickness of 0.35 to 0.5 mm. A surface of the pickled steel plate is required to be flat, smooth, and without oxide skin or other stains. The fan-shaped stamping sheet is required to be spot-welded to the ventilation channel steel. An inner end in a radial direction of the fan-shaped stamping sheet is provided with a dovetail groove, and the lining ring is located at the dovetail groove of the fan-shaped stamping sheet.

As shown in FIG. 6, after the stacking sheets 010 are superposed, since the ventilation duct steel props between the stacking sheets 010, there will be a through groove extending in the radial direction of the stator core at the position where the ventilation channel steel is welded, that is, the radial cooling ventilation duct 040 configured for cooling is provided at the position of the ventilation channel steel.

The above cooled airflow diffused at the tail portion of the nacelle 100' enters the interior of the generator 500' through the cooling airflow inlet orifice plate 500a'. As shown in FIG. 7, the cooling airflow entering the interior of the generator 500' may enter an interior of the iron core through the radially through cooling ventilation duct 040, to take away the generated heat, and flows to a confluence passage 070, and then enter a hot air drawing and confluence device 050. Under the action of the internal circulation induced draft fan 202', the airflow flows through the internal circulation airflow drawing and conveying pipe 400' to enter gaps formed between fins of the heat exchanger core of the surface type heat exchanger 300' and flows along the gaps, the airflow is re-cooled by the external circulation cooling airflow at the other side of the heat exchange fin in the heat exchanger core. The airflow passes through a confluence device 060, is sucked into a rotor of the induced draft fan 202' by the induced draft fan 202', receives the work applied by the rotor and is pressurized, and is discharged in the radial direction of the rotor into the tail portion of the nacelle 100', and then is diffused.

Due to the action of the internal circulation induced draft fan 202', a negative pressure is created at a side, close to the nacelle 100', of the cooling airflow inlet orifice plate 500a' of the generator which is in communication to the nacelle 100', and a positive pressure is provided at an outlet of the internal circulation induced draft fan 202'. Driven by a pressure difference between the positive pressure and the negative pressure, heat exchange is performed between the airflow in a large space in the nacelle 100' and an inner wall of the nacelle 100', different situations that heat is released from the airflow to the inner wall of the nacelle 100' or the airflow is heated by the inner wall of the nacelle 100' may occur depending on different seasons. Heat exchange is also performed between the airflow and machinery equipment in the nacelle 100', and between the airflow and electrical equipment in the nacelle 100', and finally the airflow is reintroduced into the generator 500' through the cooling airflow inlet orifice plate 500a', and the above process is repeated. That is, a closed air supply passage of the internal circulation airflow is formed inside the nacelle 100', as shown by peripheral arrows in FIG. 7, the annular closed air supply passage is formed.

For the permanent magnet direct drive wind turbine, in a case that airflow in the external natural environment is used to cool magnetic poles at two sides of the air gap of the generator and surfaces of the stator core, the cooling effect is good. However, the airflow in the external natural environment generally carries various forms of substances to flow through the gaps inside the generator, and the various forms of substances may be gas-steam-liquid-solid multiphase flow, including air, water vapor, rain, snow, salt spray, sand, floc, etc., which may cause deterioration of insulation performance of insulation materials inside the generator, resulting in deterioration of the electrical insulation performance and the mechanical properties of the insulation of the generator, reduction in the residual withstand voltage level and the service life of the insulation materials, and ultimately damaging the insulation. In addition, a protective coating on surfaces of the permanent magnetic poles may also be affected by moisture and heat, and the protective coating may be peeled off from the surfaces of the permanent magnetic poles caused by expansion due to moisture and heat, which may even lead to a hidden danger of rusting of the magnetic poles.

When the closed cycle cooling generator (which uses the internal circulation airflow) is employed, the risk of erosion of internal components of the generator due to rain can be avoided, and the reliability of electrical insulation and magnetic pole protection is improved. However, energy loss of on-way resistance and local resistance during the conveying process of the internal circulation airflow is great, which restricts improvement of a heat exchange rate of a heat generation link inside the generator, resulting in a large temperature rise of the key components inside the generator, for example, the conductor insulation structure of the generator, and the stability of performance of the permanent magnetic poles is threatened.

SUMMARY

A heat exchange or drying device for a heat source of an iron core is provided according to the present application, including a sprayer into which airflow can be introduced. The sprayer is provided with spray holes, and the airflow can be sprayed to an end portion of an iron core through the spray holes.

The sprayer sprays cold or hot airflow at the end portion of the iron core, so as to create a cooled and/or drying environment at the end portion of the iron core and windings thereof, which is conducive to the heat dissipation of the iron core and the windings thereof, and the maintenance and preservation of the insulation performance of end portions of the windings, including the insulation of the windings and the insulation between the windings and the iron core, and is also conducive to the protection of magnetic poles and protective coatings thereof.

An electromagnetic device is further provided according to the present application, which includes an iron core and further includes a heat exchange or drying device for the iron core, and the heat exchange or drying device the heat exchange or drying device for the iron core according to any one of above solutions.

A wind turbine is further provided according to the present application, including a generator, wherein the generator includes an iron core, and the wind turbine further includes the heat exchange or drying device for the iron core according to any one of above solutions.

The electromagnetic device and the wind turbine include the heat exchange or drying device for the iron core, and they both have the same technical effects.

REFERENCE NUMERALS IN FIGS. 1 to 7

Figure 1:
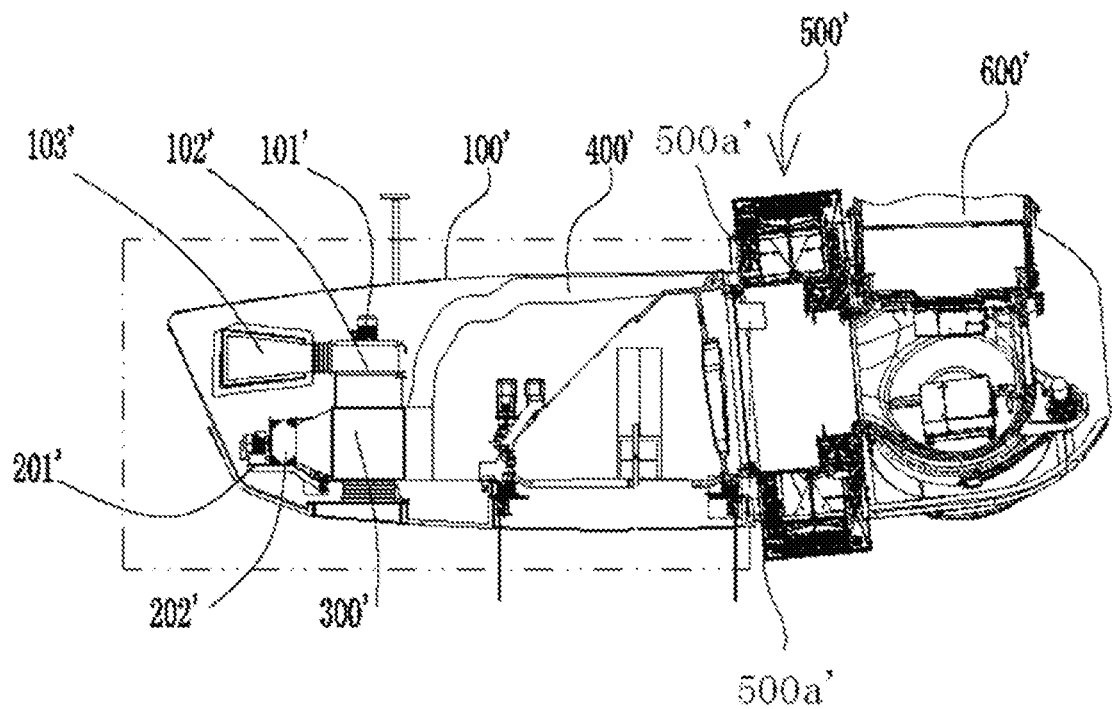
FIG. 1 is a schematic view showing an overall layout of a whole machine in which an interior of a generator is cooled by a surface type heat exchanger with air as a cooling medium.
Figure 2:
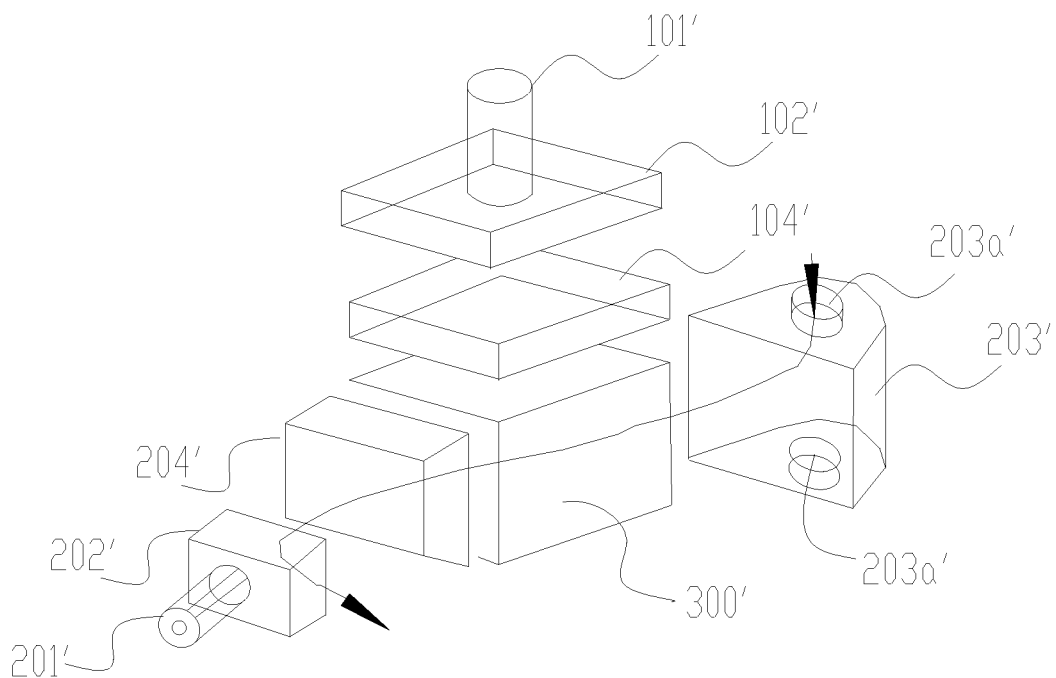
FIG. 2 is an exploded schematic view showing the structure of the surface type heat exchanger in FIG. 1.
Figure 3:
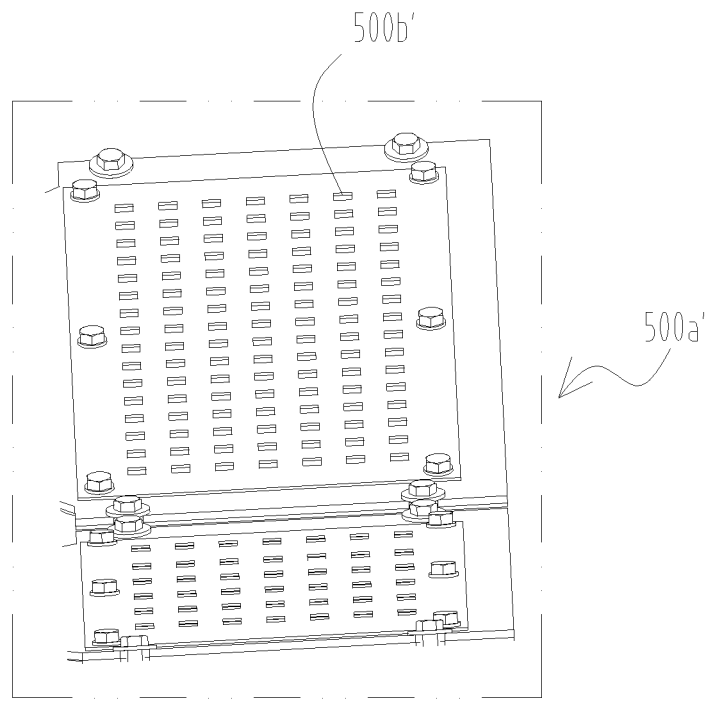
FIG. 3 is a schematic view of a cooling airflow inlet orifice plate in FIG. 1.
Figure 4:
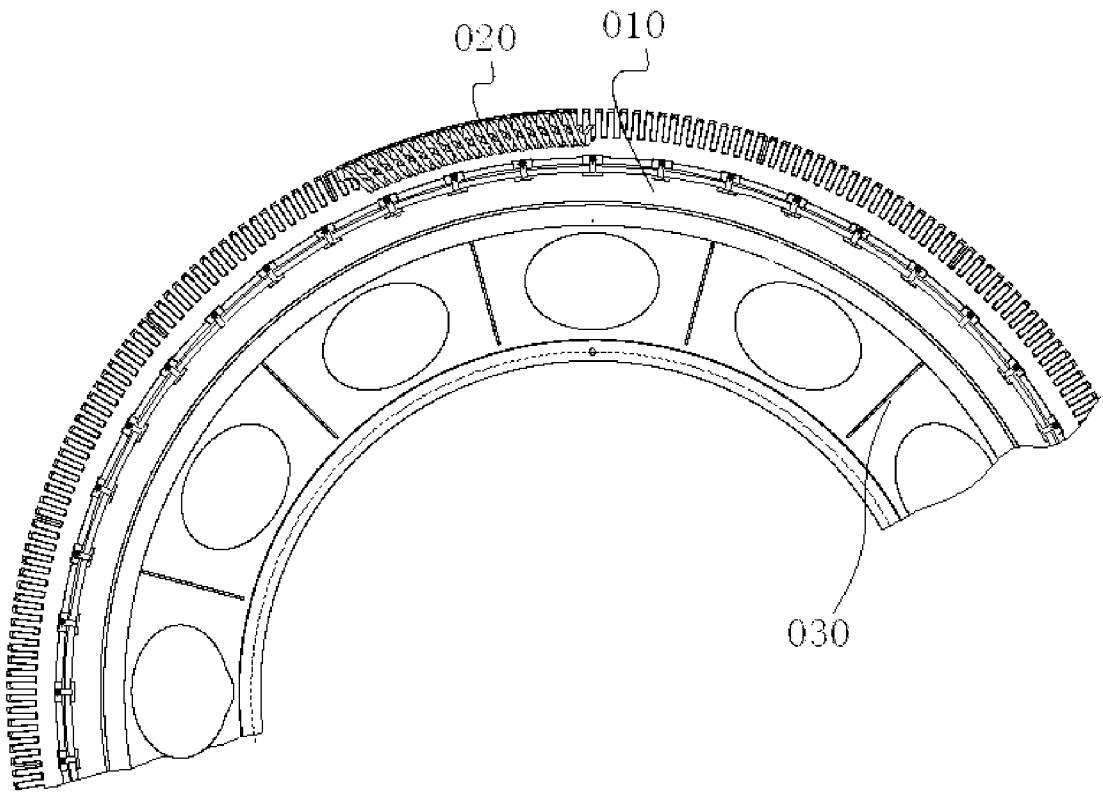
FIG. 4 is a schematic view showing a state that windings and a ferromagnetic component the generator are assembled.
Figure 5:
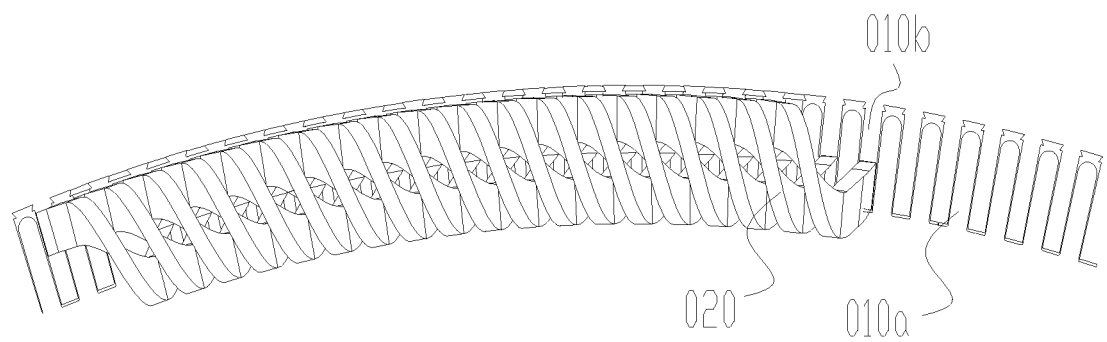
FIG. 5 is a partial schematic view showing that the windings in FIG. 4 are placed in open slots.
Figure 6:
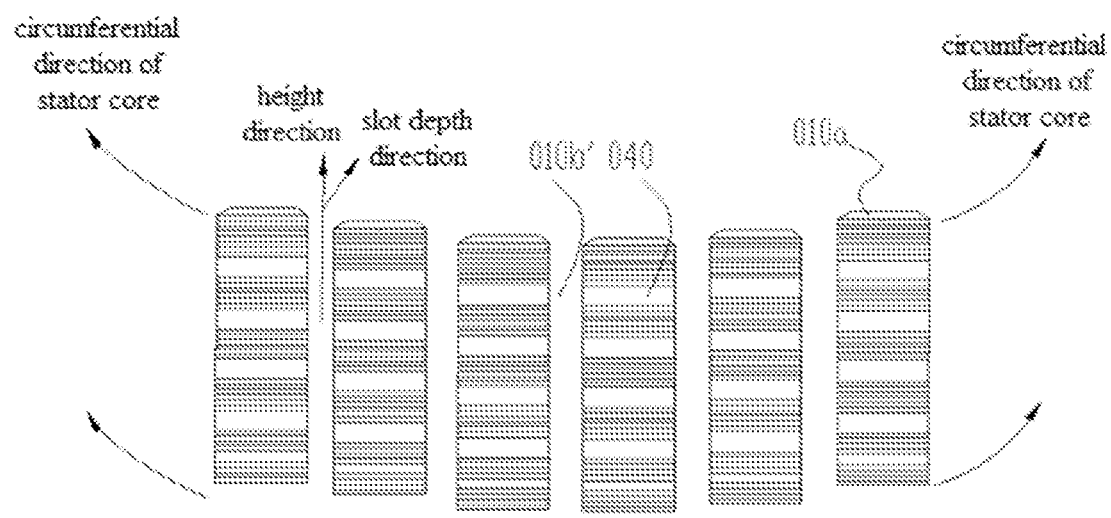
FIG. 6 is a schematic view showing that cooling ventilation ducts radially running through an iron core of the generator is formed on the iron core of the generator.
Figure 7:
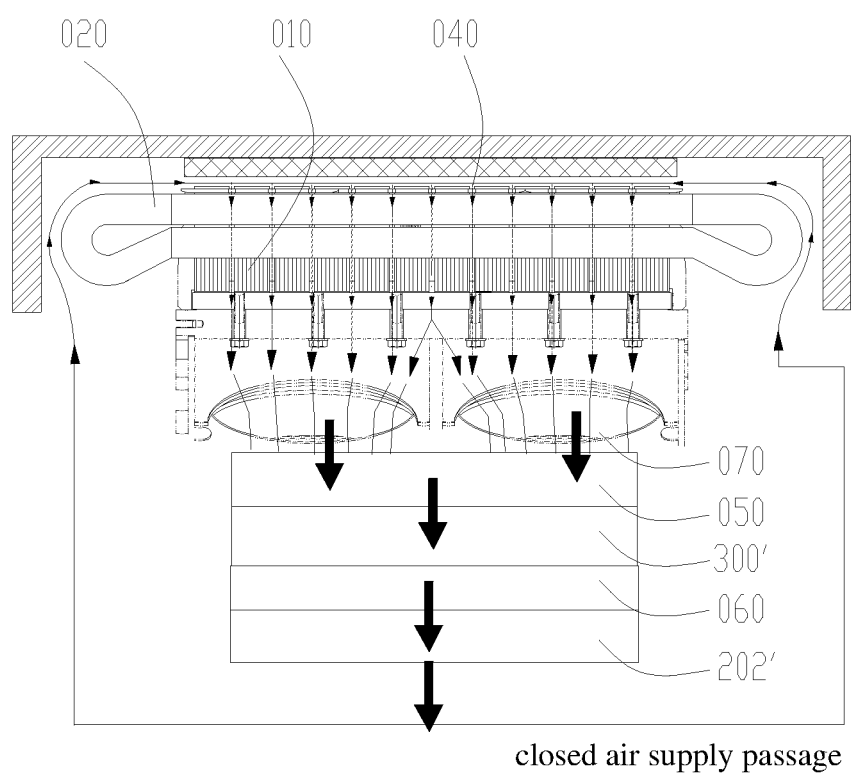
FIG. 7 is a schematic view showing a cooling airflow flow path in a case that the radial cooling ventilation ducts of the generator cooperates with the surface type heat exchanger.

100' nacelle, 101' external circulation drive motor,
102' external circulation induced draft fan,
103' external circulation airflow discharge port,
104' inlet connecting section of external circulation induced draft fan;
201' internal circulation driving motor, 202' internal circulation induced draft fan,
203' internal circulation confluence chamber,
204' inlet connecting section of external circulation induced draft fan;
300' surface type heat exchanger;
400' internal circulation airflow drawing and conveying pipe,
500' generator, 500a' cooling airflow inlet orifice plate,
500b' inlet orifice;
600' rotor;
010 stacking sheet, 010a tooth portion,
010b open slot, 010b' winding slot;
030 structural support, 040 cooling ventilation duct,
050 hot air drawing and confluence device,
060 confluence device, 070 confluence passage;

REFERENCE NUMERALS IN FIGS. 8 to 28

200 generator, 201 magnetic yoke,
202 magnetic pole, 202a pressing bar,
203 winding, 203a winding end portion;
204 iron core, 204a tooth portion,
204b slot;
205 radial cooling passage, 206 slot wedge,
207 second iron core fastener, 208 iron core support,
209 tooth pressing plate, 210 first iron core fastener,
210t airflow passage, 210a first passage,
210b second passage, 210h recovery passage,
211 side wall passage, 212 busbar,
213 enclosing plate, 214 end cover sealing ring,
215 rotor end cover;

10 vortex flow separator, 101 vortex flow separation pipe,
101a vortex flow chamber, 101a1 end plate,
1101b hot end pipe section, 101c cold end pipe section,
101d cold end, 101e hot end,
102 jet pipe, 103 throttling member,
annular spray pipe, 20a airflow dividing pipe,
20b connecting pipe, 40 cold airflow main pipe,
401 branch pipe, 50 hot airflow confluence pipe,
air filter, 70 compressor,
a air gap, s clearance.

DETAILED DESCRIPTION OF THE EMBODIMENTS

For making those skilled in the art better understand the technical solution of the present application, the present application will be described further in detail hereinafter in conjunction with the drawings and embodiments.

A heat exchange or drying device for an iron core according to the present embodiment includes a sprayer capable of introducing airflow. The airflow may be cold airflow or hot airflow, which is not limited to introduction of only the cold airflow or only the hot airflow, and the introduction of the cold airflow and the hot airflow can be switched in different periods according to actual needs. Introduction of the cold airflow can perform cooling and drying functions at the same time, and introduction of the hot airflow can better perform the drying function. The sprayer is provided with spray holes, and the airflow introduced into the sprayer can be sprayed to an end portion of the iron core through the spray holes, to cool and dry the end portion of the iron core.

First Embodiment

Figure 8:
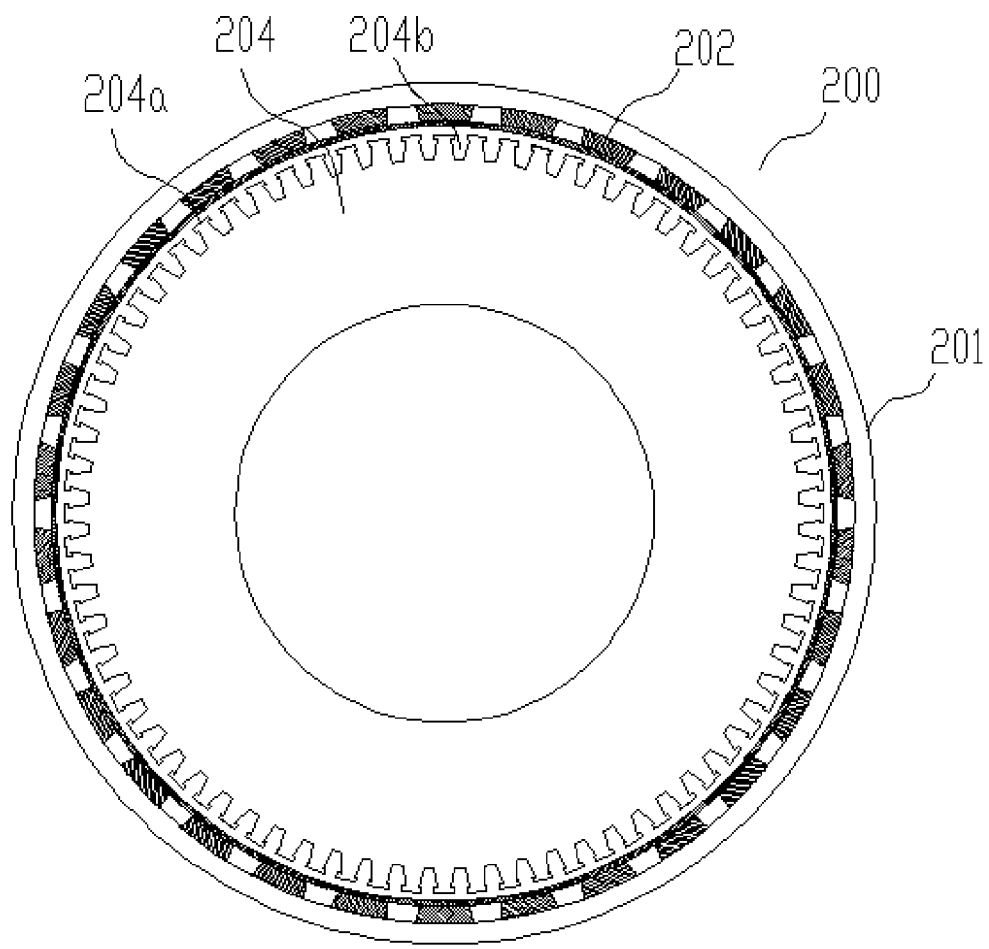
FIG. 8 is a schematic view showing a specific embodiment of the iron core of the generator that an inner stator cooperates with an outer rotor.
Figure 9:
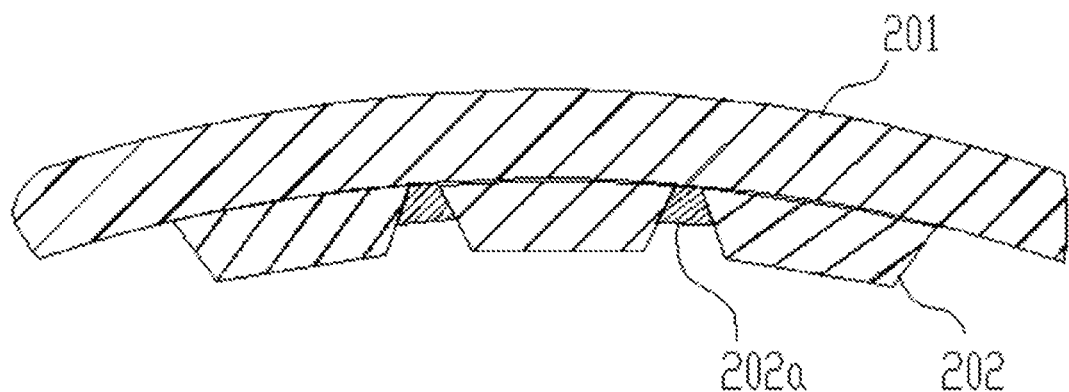
FIG. 9 is a partial view showing a magnetic pole of the rotor in FIG. 8 and fixation thereof.
Figure 10:
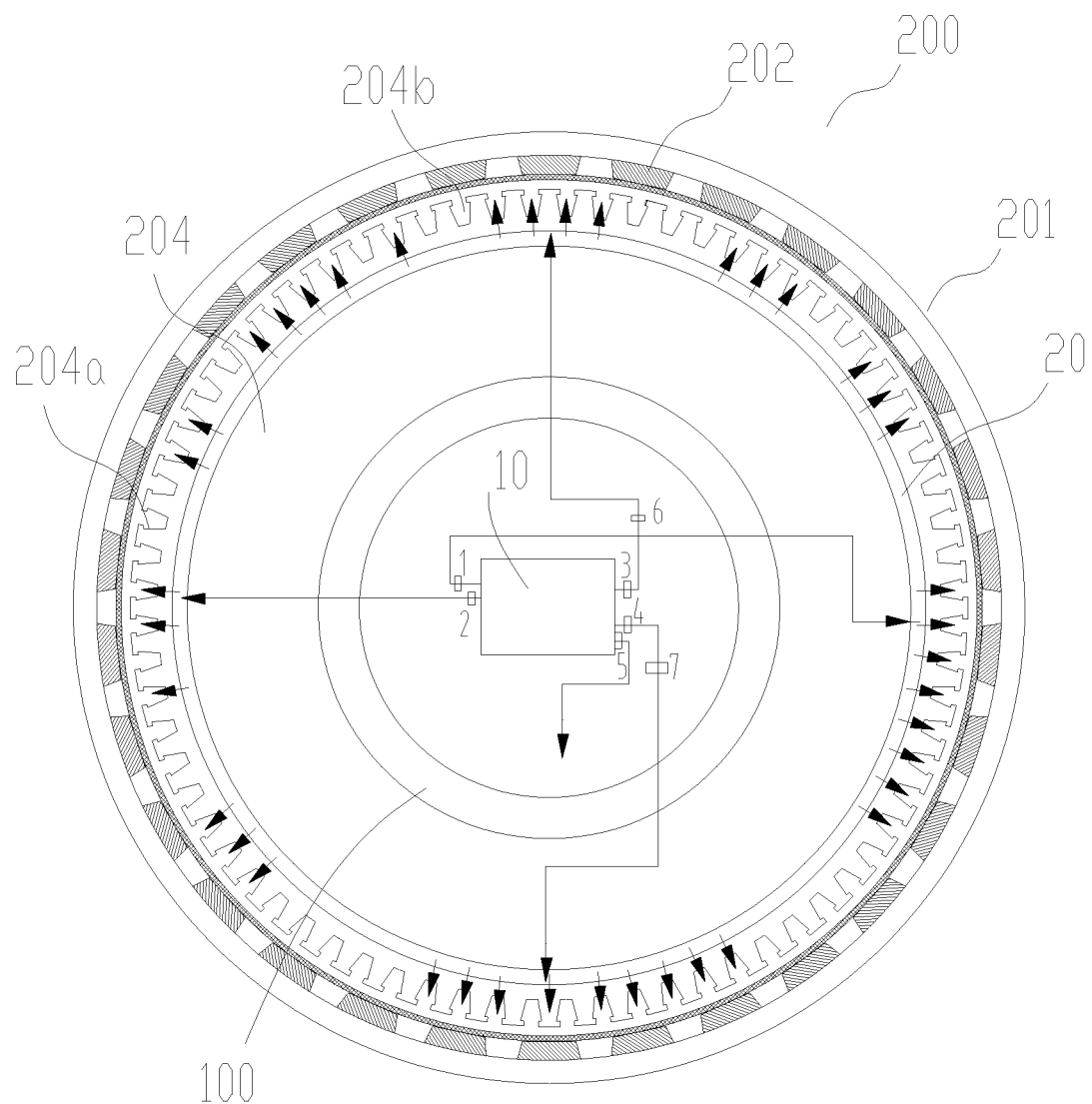
FIG. 10 is a schematic view showing a heat exchange or drying device for an iron core according to a first embodiment of the present application.

Referring to FIGS. 8 to 10, FIG. 8 is a schematic view showing a specific embodiment of an iron core 204 of a generator that an inner stator cooperates with an outer rotor; FIG. 9 is a partial view showing a magnetic pole of the rotor in FIG. 8 and fixation thereof; FIG. 9 shows a pressing bar and the specific structure of the pressing bar, which is only an example. It can be understood that, the magnetic pole is not necessarily fixed by the pressing bar, for example, when the magnetic pole is a magnetic pole module, the pressing bar may not be required. FIG. 10 is a schematic view showing a heat exchange or drying device for the iron core 204 according to a first embodiment of the present application.

As shown in FIGS. 8 and 9, the iron core 204 is formed by stacking multiple layers of stacking sheets in an axial direction. Tooth portions 204a are provided at outer edges of the stacking sheets, slots 204b are formed between adjacent tooth portions 204a, and the slots 204b are used to accommodate windings 203 (not shown in FIG. 8, but shown in FIG. 11). The generator may have a structure with an outer stator and an inner rotor, or a structure with an outer rotor and an inner stator. As an example, the iron core 204 of the stator is located in an inner chamber of the rotor, the rotor includes a magnetic yoke 201 located at an outer side, magnetic poles 202 are mounted at an inner wall of the magnetic yoke 201, the magnetic poles 202 may be permanent magnets, and a pressing bar 202a presses tightly between the adjacent magnetic poles 202. As described above, press-connection by the pressing bar 202a is only an example. When the magnetic pole is a magnetic pole module, the pressing bar may not be provided. The magnetic pole module includes a bottom plate or a base plate, the magnetic pole is fixed to the bottom plate or the base plate, and the bottom plate or the base plate may be directly fastened to a corresponding rotor magnetic pole mounting surface by welding or screw connection, or, the pressing bar may be provided to connect the bottom plate or the base plate of the magnetic pole module to the rotor magnetic pole mounting surface by press-connection.

The iron core 204 is in an annular shape, therefore, in this embodiment, the sprayer is specifically an annular spray pipe 20 matching with the annular shape of the iron core 204. The annular spray pipe 20 is arranged at an end portion of the iron core 204, and multiple spray holes are provided in a circumferential direction of the annular spray pipe 20. The "matching" herein refers to that a diameter of the annular spray pipe 20 is substantially equal to that of the iron core 204, which means that the diameter of the annular spray pipe 20 may be equal to, or slightly greater than or slightly less than that that of the iron core 204, so that when the multiple spray holes of the annular spray pipe 20 sprays the airflow, the airflow can reach the whole annular end portion of the iron core 204. Diameters of the spray holes may be equal or different. For example, a spray hole closer to an airflow inlet of the annular spray pipe 20 may have a smaller diameter, and a spray hole farther away from the airflow inlet may have a larger diameter, so that spraying flow of all spray holes may be more uniform.

It can be understood that, for this purpose, the annular spray pipe 20 does not have to be a complete annular shape. For example, the annular spray pipe 20 may include a plurality of segments, and intervals may be provided between the plurality of segments; or, no interval is provided between the segments, and the segments are spliced or sleeved to form the annular shape. In an embodiment, the sprayer may also be an arc segment, which can rotate to achieve 360 degree spraying. Segmented arrangement is conducive to transportation and storage and convenient for replacement and maintenance, which reduces maintenance costs. It can be understood that the specific shape of the sprayer is not limited in this embodiment, and the requirements can be met as long as the whole annular end portion of the iron core 204 can be basically sprayed. Of course, in a case that the annular spray pipe 20 is annular, the introduction of the airflow is convenient to control.

As shown in FIG. 10, the annular spray pipe 20 is mounted at an end face of the iron core 204. The end face of the iron core 204 is an outer surface of a stacking sheet located at a top layer or a bottom layer of the iron core 204. The stacking sheet includes a stacking sheet body and multiple tooth portions 204a formed at an outer edge of the stacking sheet body. An outer surface of the stacking sheet body has a certain area and can serve as a mounting surface of the annular spray pipe 20, the annular spray pipe 20 can be fixed to the mounting surface through fasteners, and the fasteners may be bolts, for example. Of course the sprayer is not limited to be fixed to the mounting surface described herein, and the sprayer may be movably connected to the mounting surface, so that the sprayer can better to spray a position requiring cooling or drying.

Two ends of the iron core 204 are provided with two end faces, respectively, so each of the two end faces of the iron core 204 may be provided with the annular spray pipe 20 shown in FIG. 10. Of course, the annular spray pipe 20 may be arranged at only one of the end faces. After the annular spray pipe 20 is arranged at the end face of the iron core 204, the airflow can be introduced into the annular spray pipe 20, and the airflow may be hot or cold airflow. In a case that the cold airflow is introduced, the cold airflow can be sprayed to the end portion of the iron core 204, to complete the heat exchange and take away the heat generated by components such as the iron core 204 and the windings 203 arranged at the end portion of the iron core 204, so as to cool the end portion of the iron core 204 and improve the cooling environment of the iron core 204. In fact, the cooling airflow also has a drying effect to a certain extent. In a case that the hot airflow is introduced into the annular spray pipe 20, the drying effect is better. The hot airflow may be chosen to be introduced in a case that the iron core 204 is not in operation and the environment is relatively humid, to avoid increment of a thermal load. In order to spray the airflow more evenly, the multiple spray holes can be evenly distributed in the circumferential direction of the annular spray pipe 20.

Figure 11:
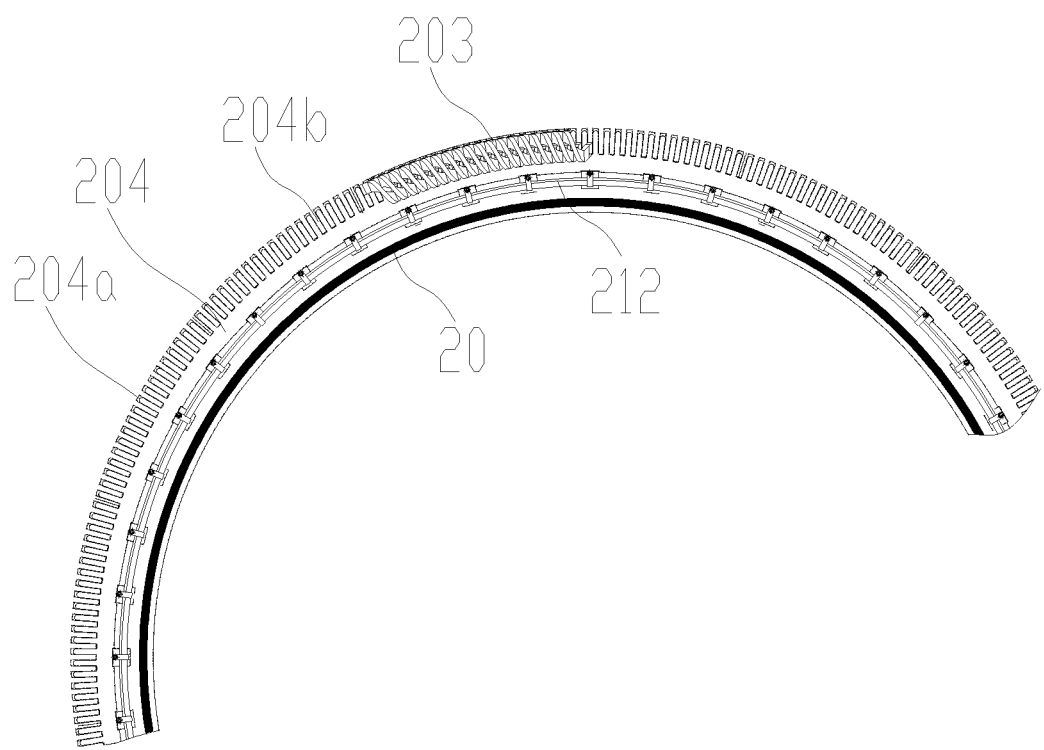
FIG. 11 is a schematic view showing that an annular spray pipe is arranged at an end face of the iron core.

As shown in FIG. 11, which is a schematic view showing that the annular spray pipe 20 is arranged at the end face of the iron core 204. FIG. 11 shows a busbar 212 and only a part of the annular end face of the iron core 204.

FIG. 11 shows that the slots 204b are formed between the tooth portions 204a of the stacking sheets of the iron core 204, and windings 203 are accommodated in the slots 204b. The windings 203 have connectors. The end face of the iron core 204 is generally provided with the annular busbar 212, and a connector of each group of windings 203 is connected to the busbar 212, so as to meet the requirements of electrical connection. In this case, the annular spray pipe 20 may be located at a radially inner side or a radially outer side of the busbar 212. In FIG. 11, the annular spray pipe 20 is located at the radially inner side of the busbar 212. In this way, when the annular spray pipe 20 sprays the cold or hot airflow, the busbar 212 can also be cooled and dried. In a case that the annular spray pipe 20 is located at the radially outer side of the busbar 212, the annular spray pipe 20 may be provided with spray holes located at an inner side of the annular spray pipe 20 to spray the airflow to the busbar 212.

As shown in FIG. 10, the airflow can be sprayed radially inward or outward. In FIG. 10, the airflow is sprayed radially outward, that is, the airflow is sprayed in a direction toward the rotor. In addition to performing heat exchange or drying at the end portion of the iron core 204, the sprayed airflow can also enter into a clearance at roots of the slots 204b and an air gap between the rotor and the iron core 204 for better cooling and drying. The sprayed airflow can also be axially sprayed (not shown in the figure). In this case, the annular spray pipe 20 may have a certain height, that is, the annular spray pipe 20 axially protrudes from the end face of the iron core 204 and is a certain distance away from the end face of the iron core 204. In this case, the spray holes are arranged at a bottom of the annular spray pipe 20 to realize axial spraying, and the airflow is sprayed towards the end face of the iron core 204.

Or, a support foot is provided at the end face of the iron core 204, and the annular spray pipe 20 supported by the support foot may be arranged to face the windings 203 in the axial direction. In this case, the spray holes are arranged at the bottom of the annular spray pipe 20 to spray directly toward the windings 203 in the axial direction, and the airflow can enter into the windings 203 and the roots of the slots 204b. Of course, the spray holes in the annular spray pipe 20 may be arranged to be tilted, so as to achieve the above purpose. In addition, a nozzle may further be provided at the annular spray pipe 20, and an extending length and a spraying angle of the nozzle can be arranged according to needs, so as to control a target position of the spraying. The airflow may be sprayed in the axial direction or the radial direction, or both the axial and radial directions at the same time, and may also be sprayed with other angles.

Figure 17:
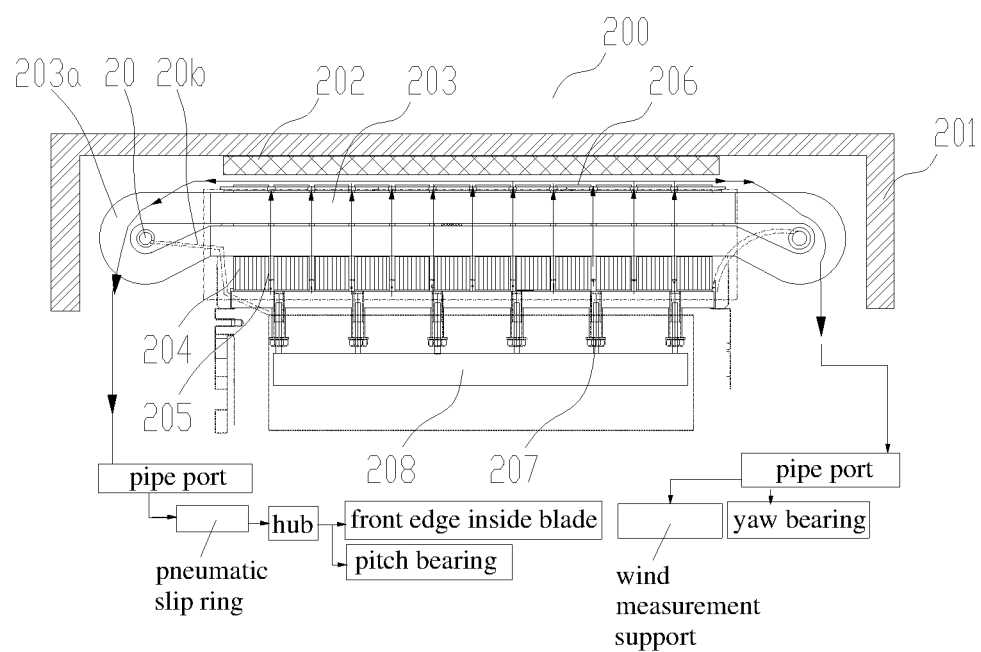
FIG. 17 is a schematic view showing a heat exchange or drying device for an iron core according to a second embodiment of the present application, in which an annular spray pipe runs through a through hole at winding end portions.

As shown in FIG. 11, the airflow is sprayed at the end portion of the iron core 204, which can cool and dry the iron core 204. More importantly, after the winding 203 is placed into the slot 204b of the iron core 204, a slot wedge 206 (as shown in FIG. 17) is further inserted in the axial direction, to prevent the winding 203 from getting out of the slot 204b in the radial direction. After an impregnation process for insulation, insulating varnish is provided among the slot wedge 206, the slot 204b and the winding 203, to create a dry environment at the end portion of the iron core 204, which is conducive to providing a dry environment for the insulating varnish at the end portion of the winding 203 at this position, and thereby improving the insulation performance. That is, the cold airflow or the hot airflow (compared with the cold airflow, the drying effect is better) can be used for drying a junction of the root of the end portion of the winding 203 and the iron core 204.

Figure 12:
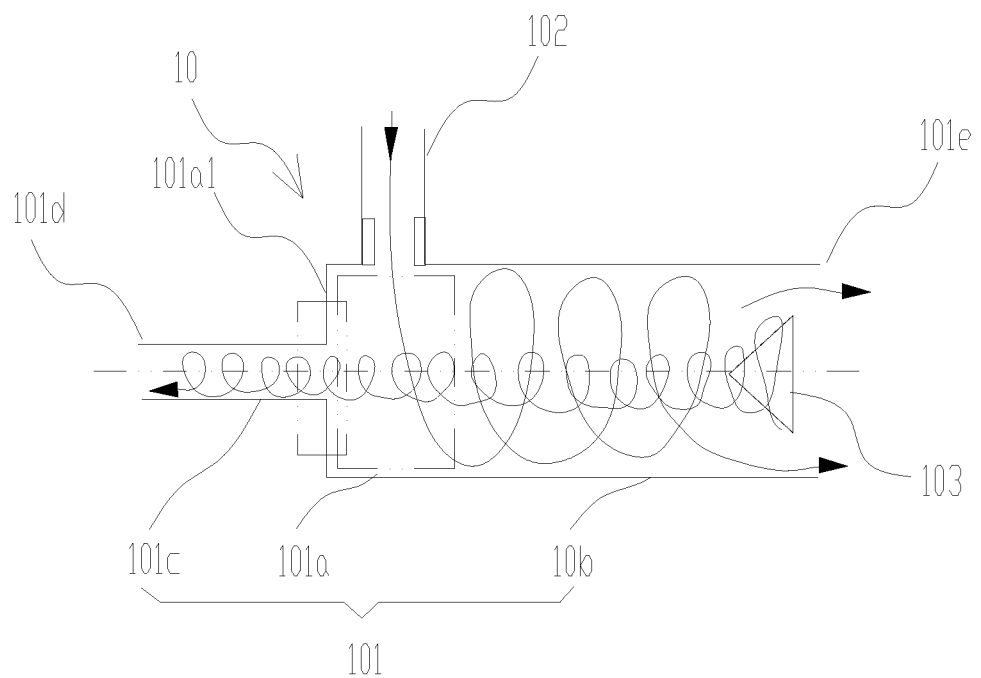
FIG. 12 is a schematic view showing the basic structure of a vortex flow separator and a working principle of total temperature separation of airflow.
Figure 13:
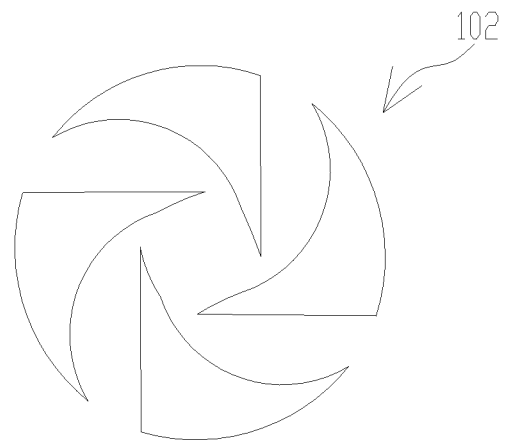
FIG. 13 is a schematic view showing a flow section of a flow passage of a jet pipe in FIG. 12.

With continued reference to FIG. 10, an airflow supply device is provided in FIG. 10, which can generate the cold airflow and the hot airflow. With specific reference to FIGS. 12 and 13, FIG. 12 is a schematic view showing the basic structure of the vortex flow separator and a working principle of total temperature separation of the airflow. The fluid has pressure, temperature, density, speed and Mach number when it flows. If the fluid is completely static in an adiabatic process, a kinetic energy of the fluid will be converted into an internal energy, which is reflected in the pressure, temperature and density, the temperature in this case is a total temperature. FIG. 13 a schematic view showing a flow section of a flow passage of a jet pipe in FIG. 12.

In FIG. 12, the vortex flow separator 10 serving as a cold source of the iron core 204 itself includes a jet pipe 102 and a vortex flow separation pipe 101. The jet pipe 102 is in communication with a side wall of the vortex flow separation pipe 101. A portion of an inner chamber of the vortex flow separation pipe 101 directly facing the jet pipe 102 forms a vortex flow chamber 101a. A cold end pipe section 101c is located at one end of the vortex flow chamber 101a (a left end in FIG. 10), and a hot end pipe section 101b is located at another end of the vortex flow chamber 101a (a right end in FIG. 10). An outlet of the cold end pipe section 101c is a cold end 101d for outputting the cold airflow, and an outlet of the hot end pipe section 101b is a hot end 101e for outputting the hot airflow. An end plate 101a1 located at one end of the vortex flow chamber 101a is provided with a through hole, the end plate 101a1 is defined as a cold end orifice plate herein, and the cold end pipe section 101c is in communication with the through hole. As shown in FIG. 12, the cold end pipe section 101c is a relatively thin pipe section having a cross-sectional area smaller than that of the vortex flow chamber 101a. The vortex flow chamber 101a and the hot end pipe section 101b have equal diameters, the vortex flow chamber 101a and the hot end pipe section 101b can be integrally or separately arranged, and the integral arrangement is simpler.

The jet pipe 102 of the vortex flow separator 10, which serves as the cold source carried by the iron core 204 itself in the electromagnetic device, is an energy conversion component that converts pressure energy of compressed air into kinetic energy carried by high-speed airflow. The jet pipe 102 may include an inlet section, a body section, and an outlet section, and the outlet section is provided with a nozzle for spraying the airflow. The nozzle is a common energy conversion component of a thermal power device or a refrigeration device. Spiral airflow is formed after the airflow passes through the jet pipe 102, as shown in FIG. 13, a swirl plate is arranged inside the jet pipe 102, that is, the outlet section of the jet pipe 102 is a volute, and after entering the jet pipe 102, the airflow forms the spiral airflow to be outputted. The jet pipe 102 is required to be in communication with the vortex flow chamber 101a tangentially, that is, the spiral airflow sprayed out of the jet pipe flows swirlingly into the vortex flow separation pipe 101 in a tangential direction of the vortex flow separation pipe 101. The airflow can be uniformly distributed to the nozzle at the output section of the jet pipe 102 by the volute, the energy loss is minimized, and it is ensured that the airflow flows axisymmetrically at an inner circumference of the volute.

Since the cross-sectional area of the cold end pipe section 101c is relatively small, as for the spiral airflow entering the vortex flow chamber 101a, resistance at the cold end 101d orifice plate is relatively large, and the airflow tangentially swirled into the vortex flow separation pipe 101 flows toward the hot end pipe section 101b in an opposite direction of the cold end 101d. Here, a cross-sectional area of the hot end pipe section 101b may be equal to or greater than that of the vortex flow chamber 101a, to ensure that the spiral airflow will flow toward the hot end pipe section 101b.

A valve having a conical surface is further provided in the hot end pipe section 101b, the valve is specifically embodied as a conical throttling member 103 as shown in FIG. 12, and a conical end of the throttling member 103 faces a direction opposite to a flowing direction of the spiral airflow. As shown in FIG. 12, after the spiral airflow enters the vortex flow separation pipe 101 from the jet pipe 102, the airflow flows spirally from left to right. When the spiral airflow reaches the throttling member 103, external airflow of the spiral airflow can flow out from the valve, that is, the external airflow of the spiral airflow flows out through an annular clearance between the throttling member 103 and the vortex flow separation pipe 101 and is heated up to become hot airflow, as shown in FIG. 12, the hot airflow flows out from the hot end 101e of the hot end pipe section 101b.

Central airflow of the spiral airflow will collide with the throttling member 103. After colliding with the conical surface of the throttling member 103, the airflow is guided by the conical surface of the throttling member 103, to flow swirlingly in an opposite direction to form reflux airflow. During the above flowing process, the airflow will be cooled down gradually, and a temperature of the cooling airflow can be greatly reduced to −50 to 10° C. The external airflow and the central airflow herein are defined with respect to a center line of the spiral airflow, the spiral airflow close to the center line is the central airflow, and the airflow away from the center line and close to a radially outermost side of the spiral airflow is the external airflow. In order to ensure that the spiral airflow flows to the hot end pipe section 101b and then flows reversely, to form the hot airflow and the cold airflow, the throttling member 103 may be arranged at a tail end of the hot end pipe section 101b.

In the above technical solution, since it is required that the spiral flow can flow reversely after passing through the valve, the conical throttling member 103 is provided. For forming the reflux spiral airflow, the valve is only required to have a certain range of a conical surface, for example, the valve is like a truncated cone (that is, a section of a cone without a cone tip), or a half cone formed by cutting a cone in an axial direction. However, it can be understood that, in order to better form a choking effect and to better guide the reflux spiral airflow, it is preferred that the valve is provided to be a complete cone as shown in FIG. 12. In addition, an axis of the conical throttling member 103 coincides with an axis of the cold end pipe section 101c, which facilitates the swirling flow of the airflow when the reflux spiral airflow flows swirlingly toward the cold end pipe section 101c, and thereby reducing the energy loss.

It can be seen that, the vortex flow separator 10 of the iron core 204 of the electromagnetic device which carries the cold source itself can generate a temperature separation effect that performs temperature separation to a stream of airflow, to obtain two streams of airflow, that is, cold airflow and hot airflow, and an extremely large temperature difference exists between the two streams of airflow. The vortex flow separator 10 is researched based on the phenomenon of tornadoes.

A tornado is a strong cyclone phenomenon in nature that occurs under certain atmospheric conditions. Oceanic vortices that travel vertically from a water surface to a seabed may also be generated in the ocean under certain atmospheric conditions. A typical tornado airflow structure shows that a tornado center is a funnel-like or trumpet-like pointed cone. This cone is a convolution zone of the tornado, a swirling direction of the cone is the same as that of rising hot airflow at a periphery filled with dust, but an axial flow direction of the airflow in the central cone is opposite to that of the rising airflow at the periphery, and the airflow in the central cone flows downward. Cold airflow in the central cone of a tornado is traced and measured in the natural environment, and a falling flow rate of the cold airflow can reach 17 m/s. Once a cone tip of the center cone diverges, the tornado is rapidly strengthened and the cone tip disappears and becomes a truncated cone. The hot airflow at the periphery swirls while rises, and when reaching a bottom surface of a cold cloud layer at an upper layer or the stratosphere, the airflow will immediately diverge swirlingly in a flare shape in a horizontal direction and change the swirling direction to be reversely thrown swirlingly. The air swirls rapidly around an axis of the tornado, being drawn due to extreme reduction of an air pressure at a center of the tornado, the airflow is drawn into a bottom of a vortex flow from all directions in a thin layer of air which is tens of meters thick close to the ground, and then becomes the vortex flow that swirls upward around the axis at a high speed. Therefore, the air in the tornado is always cyclonic, and a central air pressure is 10% lower than that of a surrounding air pressure, and the central air pressure is generally as low as 100 hPa, and a minimum value is 200 hPa. The tornado has a great sucking effect, which can suck sea water or lake water away from a sea surface or a lake surface, to form a water column to be connected with the cloud, commonly known as "dragon sucking water".

The energy source of the tornado: one energy source is heat energy of the airflow at the periphery of the tornado, and another energy source is vacuum energy in a low pressure zone at a center of the vortex flow. High temperature air of the airflow at the periphery of the tornado interacts with the tornado, causing the thermal energy to be converted into rotational kinetic energy. The mechanism is explained by the Crocco theorem. The Crocco theorem is obtained in a fluid vortex flow field based on the first law of thermodynamics, that is, conservation of energy. The theorem quantitatively expresses a relationship among a gradient of thermodynamic enthalpy, a gradient of entropy and swirling intensity of the vortex flow in the vortex flow field. Temperature differences in the atmosphere and up and down convection are prerequisites for the formation of the tornado vortex flow, and the energy that enhances the tornado vortex flow comes from the surrounding heat energy. The gradient of the thermodynamic enthalpy formed between the rising hot airflow at the periphery of the tornado and the falling cold airflow at the center of the vortex flow becomes a key factor in the conversion of atmospheric heat energy into flowing kinetic energy of the vortex flow. After intensity of the tornado reaches a certain degree with the help of the heat energy, further intensification depends on the vacuum energy in the low pressure zone at the center of the vortex flow. A lower cone of the tornado center is in the same swirling direction as the peripheral airflow. The airflow in the lower cone swirls while falling and converges toward the center at the same time. After a centripetal accelerated speed exceeds a certain critical value, the swirling of the radial peripheral airflow is accelerated by viscous diffusion during the radial confluence process under an effect of Coriolis force.

That is, the tornado has a total temperature separation phenomenon. The vortex flow separator 10 according to this embodiment is similar to the tornado, and the jet pipe 102 is provided to make the compressed airflow form spiral airflow, which can be regarded as a spiral flow of a small-scale tornado. In this way, the total temperature separation of the tornado is simulated in the vortex flow separation pipe 101, and thereby the desired hot and cold airflow are formed.

The mechanism of this technical solution is sought hereinabove from the nature world, and the principle of the temperature separation effect of the vortex flow separator 10 will be described hereinafter.

Figure 14:
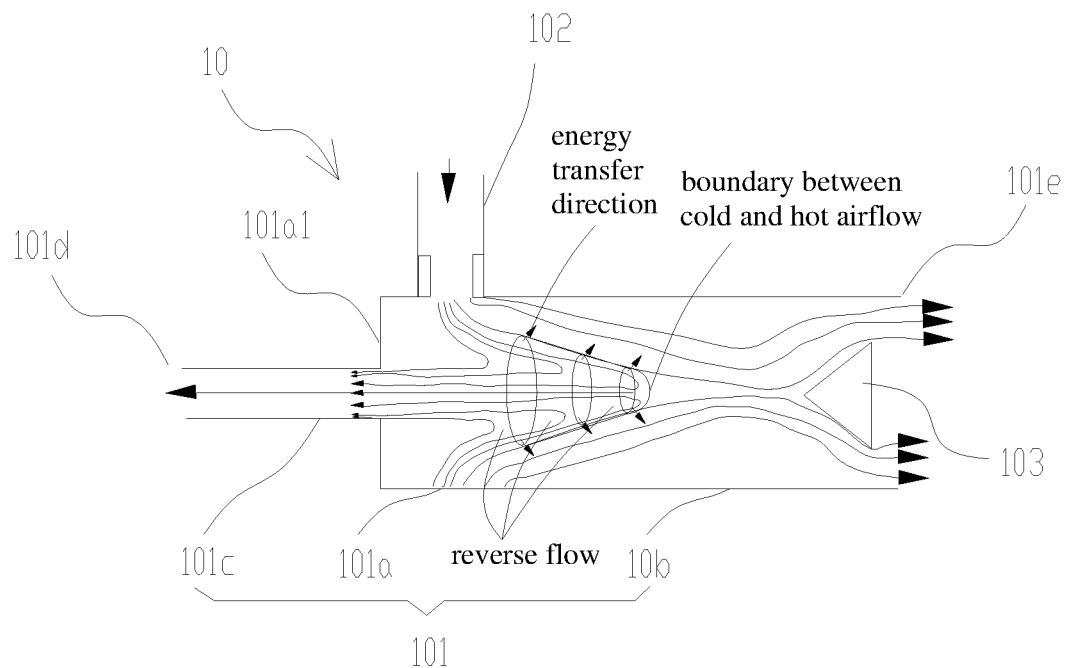
FIG. 14 a schematic view showing an internal flow field and heat energy transfer in the vortex flow separator of the iron core in FIG. 12.
Figure 15:
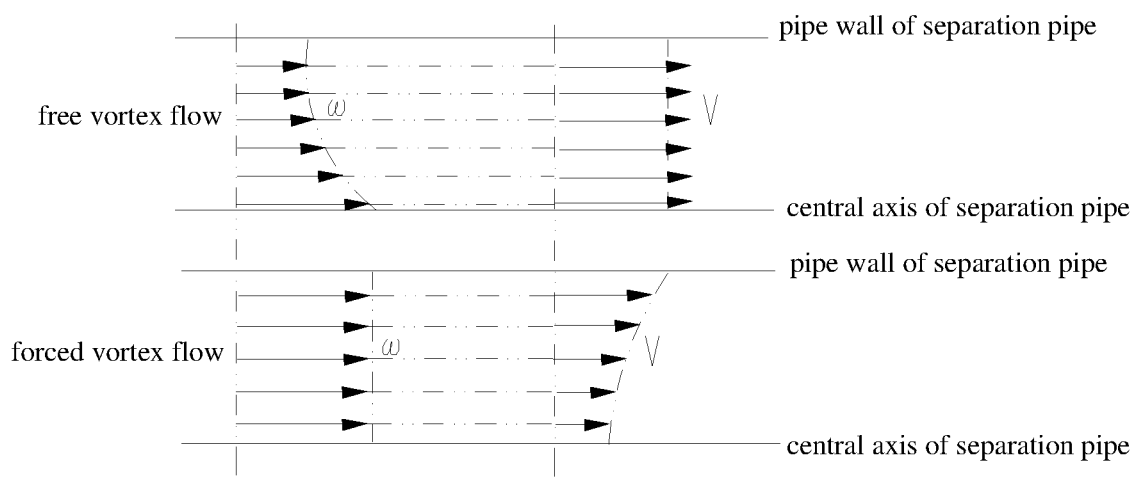
FIG. 15 is a schematic view showing the comparison between a free vortex flow and a forced vortex flow.

Referring to FIGS. 14 and 15, FIG. 14 a schematic view showing an internal flow field and heat energy transfer inside the vortex flow separator 10 of the iron core 204 in FIG. 12; and FIG. 15 is a schematic view showing the comparison between a free vortex flow and a forced vortex flow.

According to the law of energy conservation, a sum of the energy of the cold airflow and the hot airflow flowing out from the vortex flow separation pipe 101 should be equal to the energy of the compressed gas entering the jet pipe 102 of the vortex flow separator 10 (provided that the vortex flow separator 10 is well insulated). Therefore, there is necessarily a process of energy redistribution in the vortex flow separator 10 to transfer a portion of the energy from the cooling airflow to the hot airflow.

Firstly, the compressed gas is supplied to the jet pipe 102, which is hereinafter referred to as a high-pressure gas. A compressor may be provided and the compressed gas is provided by the compressor. To prevent the provided cooling airflow from affecting an internal environment of the iron core 204, an air filter may be provided at an inlet of the compressor.

The airflow of the compressed gas expands and accelerates in the jet pipe 102 of the vortex flow separator 10, and an airflow speed may approach the sound speed when the airflow is entering the vortex flow chamber 101a of the vortex flow separation pipe 101. In a case that a convergent-divergent jet pipe 102 is employed, the above airflow speed will exceed the sound speed. Since the airflow rapidly expands and passes through the jet pipe 102, which can be approximately regarded as an adiabatic process. The airflow speed is very high at the nozzle located at the outlet of the jet pipe 102, and a corresponding thermodynamic temperature of the airflow at the nozzle is much lower than a temperature of the airflow at the inlet of the jet pipe 102, that is, a primary controllable temperature drop is performed.

After the airflow enters the vortex flow chamber 101a of the vortex flow separation pipe 101 in the tangential direction, the airflow continues to move spirally along an inner wall of the vortex flow chamber 101a to form high-speed swirling airflow. When the airflow just flows out of the jet pipe 102, V=const or ωr=const, where V is a tangential speed of the airflow and ω is an angular speed. This type of swirling is also called the free vortex flow. As shown in FIG. 15, FIG. 15 shows differences of the tangential speed and the angular speed between the free vortex flow and the forced vortex flow. In this case, a moving track of the airflow in the vortex flow chamber may be seen as the Archimedes spiral. The formation of the cooling airflow and the hot airflow is analyzed hereinafter.

The formation of the hot airflow is as follows. Since the flowing of the airflow just coming out of the jet pipe 102 is the free vortex flow, the angular speed has a gradient in the radial direction, causing friction between radial layers of the airflow, such that an angular speed of the external airflow of the spiral airflow is gradually increased, and an angular speed of the central airflow of the spiral airflow is gradually reduced. However, because of the fast flow and short flowing path, the spiral airflow has not reached the full forced vortex flow, but progresses to a central portion thereof. The external airflow of the spiral airflow moves spirally in the hot end pipe section 101b, which includes both swirling movement and axial movement. During the movement, the external airflow rubs against an inner wall of the hot end pipe section 101b, thus the speed of the external airflow becomes lower and lower, the temperature of the external airflow gradually rises, and the external airflow eventually flows out through the annular clearance between the throttling member 103 and the hot end pipe section 101b. By adjusting the clearance between the throttling member 103 and the hot end pipe section 101b, a ratio of the cold airflow to the hot airflow can be adjusted.

The formation of the cold airflow is as follows. The airflow is embodied as the free vortex flow when the airflow just flows out of the jet pipe 102. Under an action of a centrifugal force, and being blocked by the cold end 101d orifice plate of the cold end pipe section 101c, the airflow will flow, near the inner wall of the hot end pipe section 101b, toward the throttling member 103. During the flowing process, due to gradual dissipation of an axial speed, when the spiral airflow moves to a certain position in the axial direction, the axial speed of the spiral airflow is already close to zero, the above position may be defined as a stagnation point. At this time, because the central airflow converges at the stagnation point, a pressure is continuously increased, and the pressure at the stagnation point is higher than a cold end 101d pressure at the outlet of the cold end pipe section 101c, thus reverse axial movement occurs in a central region of the hot end pipe section 101b, that is, reflux airflow starts from the stagnation point, and is gradually cooled down to form the cold airflow, that is, a secondary temperature drop is performed. At the stagnation point, a total temperature of the external airflow is higher than that of the central airflow. During the movement of the reverse flow to the cold end pipe section 101c, a portion of the spiral flow at an outer layer is continuously diverted to join the reverse flow, thus the reverse flow gradually expands, and a flow rate of the reverse flow reaches a maximum when the reverse flow reaches the cold end 101d orifice plate.

As shown in FIG. 14, in one cross section of the flow passage of the vortex flow separation pipe 101, a static pressure of an outermost airflow of the external airflow is maximum, and a static pressure of an innermost airflow at a central axis of the central airflow is minimum. At a cross section near the nozzle of the jet pipe 102, a ratio of a maximum static pressure to a minimum static pressure is the largest, the ratio may range from 1.5 to 2, and a static temperature is highest at a wall surface of the vortex flow separation pipe 101 and lowest at the central axis.

In any cross section of the flow passage, a tangential speed of the airflow at any point is dominant. Near the nozzle of the jet pipe 102, both a radial speed and an axial speed of the airflow reach a maximum and then gradually decrease in respective directions.

As described above, after leaving the nozzle, the airflow enters the vortex flow separation pipe 101 in the tangential direction, and the airflow is divided into two regions. The external airflow tangentially swirls toward a hot end 101e outlet of the hot end pipe section 101b along the inner wall of the vortex flow separation pipe 101, that is, the external airflow in an outer layer region forms the free vortex flow. The central airflow flows back from the position where the throttling member 103 is arranged, due to driving of the surrounding free vortex flow, and then with the friction, an inner layer region (the central airflow) in which the airflow swirls like a rigid body is converted into or to be close to the forced vortex flow.

A boundary between external and central regions, that is, the external airflow and the reflux central airflow, depend on a magnitude of a cold airflow rate. The boundary between the cold and hot airflow can be seen in FIG. 14. Over a length of the entire vortex flow separation pipe 101, an interface of the boundary is generally located within a range of 0.65 R to 0.75 R away from the central axis, which is a flowing range of the central airflow in the radial direction, where R is a radius of the vortex flow separation pipe 101. From the nozzle of the jet pipe 102 to the throttling member 103, the external airflow flows in the axial direction within a range that a radius ranges from 0.65 R to 1 R, which is a flowing range of the external airflow in the radial direction. In the inner region, the central airflow flows reversely, and the flowing starts just from the throttling member 103.

A central airflow temperature of the central airflow is highest at the throttling member 103, the reverse flow is gradually cooled down, and the central airflow temperature is lowest when the airflow reaches the cold end 101d orifice plate. A maximum temperature difference occurs in a direction of the central axis, the highest temperature is at a position of the central axis corresponding to the throttling member 103, and the lowest temperature is at a position of the central axis corresponding to the cold end 101d orifice plate. As for the central airflow at the inner layer, that is, the cold airflow, a static temperature is lowest at the central axis and reaches the maximum at the boundary between the inner layer airflow and the outer layer airflow.

In any cross section of the flow passage of the vortex flow separation pipe 101, the total temperature is highest at a position near the inner wall surface of the vortex flow separation pipe 101 and lowest at the central axis. At the cross section of the flow passage at the nozzle, a temperature difference between a wall temperature of the vortex flow separation pipe 101 and a temperature at the central axis reaches a maximum value.

Figure 16:
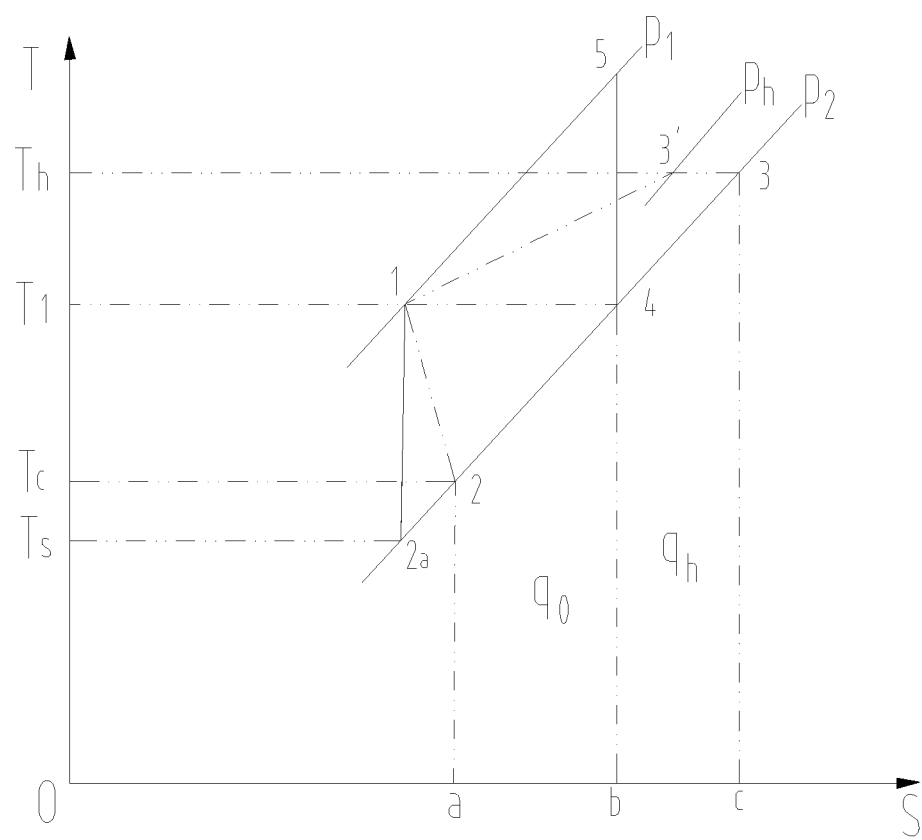
FIG. 16 is a schematic view showing a working process of the total temperature separation in the vortex flow separator in FIG. 12 based on a thermodynamic temperature-entropy (T-S) diagram.

The total temperature separation effect of the vortex flow separator 10 may refer to FIG. 16. FIG. 16 is a schematic view showing a working process of the total temperature separation in the vortex flow separator 10 in FIG. 12 based on a thermodynamic temperature-entropy (T-S) diagram. As can be seen from FIG. 16, the vortex flow separator 10 does perform temperature separation to the compressed airflow entering the jet pipe 102.

In FIG. 16, point 4 shows a state before the gas is compressed, that is, a state before entering into the compressor 70. A process from point 4 to point 5 is an isentropic compression process of the airflow. A process from point 5 to point 1 is the isobaric cooling process of the compressed gas. Point 1 represents a state before the compressed gas enters the jet pipe 102 of the vortex flow separator 10. Under an ideal condition, the compressed gas adiabatically expands to a pressure $P_2$, and then the temperature decreases to $T_s$, that is, a state of point 2a. Point 2 indicates a state of the cold airflow flowing out from the vortex flow pipe, and a temperature thereof is $T_c$. Point 3 indicates a state of the separated hot airflow, and a temperature thereof is $T_h$. A process from point 1 to point 2 and a process from point 1 to point 3 are separation processes of cold and hot airflow. A process from point 3 to point 3' is a throttling process of the hot airflow through the throttling member 103, and an enthalpy value is unchanged before and after the throttling.

During the whole working process, it is impossible for the airflow to be isentropically expanded in the jet pipe 102. Due to a certain loss in kinetic energy exchange between airflow in the inner and outer layer regions in the vortex flow chamber 101a, and a heat transfer process toward a center in the vortex flow chamber 101a, the airflow is deviated from the adiabatic expansion process in the process from point 1 to point 2, causing the temperature $T_c$ of the cold airflow separated from the vortex flow separation pipe 101 to always be higher than the temperature $T_s$ of the cold airflow under the adiabatic expansion condition.

The cooling effect and heating effect of the vortex flow separator 10 in the above embodiment are described hereinafter.

During operation, the gas with a temperature $T_1$ is separated into cold airflow with the temperature $T_c$ and hot airflow with the temperature $T_h$ by the vortex flow separation pipe 101. Therefore, $\Delta T_c = T_1 - T_c$ is called the cooling effect of the vortex flow separation pipe 101, and $\Delta T_h = T_h - T_1$ is called the heating effect of the vortex pipe. $\Delta T_s = T_1 - T_s$ is defined as an isentropic expansion effect to represent a theoretical cooling effect of the vortex flow separation pipe 101. Therefore, cooling effectiveness of the vortex flow separation pipe 101 is expressed by a cooling efficiency $\eta_c$, that is:

$$\eta_c = \frac{\Delta T_c}{\Delta T_s} = \frac{T_1 - T_c}{T_1 \left[1 - \left(\frac{p_2}{p_1}\right)^{\frac{k-1}{k}}\right]}$$

where $p_1$ represents an airflow pressure at the inlet of the vortex flow separator 10, $p_2$ represents an airflow pressure after the airflow expands in the jet pipe 102 and enters into the vortex flow chamber 101, and k represents an adiabatic index of the gas (for example, the air).

In addition, there are balances of flow and heat during the operation of the vortex flow separator 10 which are described as follows.

If flow rates of the high-speed airflow entering the vortex flow separation pipe 101, the cold airflow at the cold end 101d, and the hot airflow at the hot end 101e are indicated by $q_{m1}$, $q_{mc}$ and $q_{mh}$, respectively, then $q_{m1} = q_{mc} + q_{mh}$.

If specific enthalpy of the above airflow are indicated by $h_1$, $h_c$ and $h_h$ (KJ/Kg), respectively, and the kinetic energy when the airflow flows out is neglected, then $q_{m1}h_1 = q_{mc}h_c + q_{mh}h_h$.

A cold airflow flow ratio is $$\mu_c = \frac{q_{mc}}{q_{m1}} = \frac{q_{mc}}{q_{mc} + q_{mh}}.$$

A corresponding relationship between enthalpy and temperature of the gas is $h=C_p T$.

The following formulas are obtained:

$$T_1 = \mu_c T_c + (1 + \mu_c) T_h T$$

$$\mu = \frac{T_h - T_1}{T_h - T_c} = \frac{\Delta T_h}{\Delta T_h + \Delta T_c}$$

A cooling capacity of the vortex flow separation pipe 101 can also be obtained as follows: the cooling capacity $Q_0$ (kW) of the vortex flow separation pipe 101 is $Q_0 = q_{mc} c_p (T_1 - T_c) = \mu_c q_{m1} c_p \Delta T_c$; then, a cooling capacity per kilogram of the cold airflow is:

$$q_o = \frac{Q_0}{q_{mc}} = c_p \Delta T_c;$$

and for each kilogram of high pressure gas, its unit cooling capacity $q'_0$ can be expressed as:

$$q'_0 = \frac{Q_0}{q_{m1}} = \mu_c c_p \Delta T_c = \mu_c q_0.$$

A heating capacity $Q_h$ (kW) of the vortex flow separation pipe 101 is: $Q_0 = q_{mh} c_p (T_h - T_i) = (1 - \mu_c) q_{m1} c_p \Delta T_h$ The heating capacity per kilogram of the hot airflow is:

$$q_h = \frac{Q_h}{q_{mh}} = c_p \Delta T_k;$$

and for each kilogram of high pressure gas, its unit heating capacity can be expressed as:

$$q'_h = \frac{Q_h}{q_{m1}} = (1 - \mu_c) c_p \Delta T_h.$$

The cooling effect $\Delta T_c = T_1 - T_c$ and the unit cooling capacity $q_0$ of the vortex flow separator pipe 101 are related to the following factors, that is, a cold airflow component $\mu_c$, the working pressure $p_1$ at the inlet of the jet pipe 102, and a water vapor content in the airflow.

As for the cold airflow component $\mu_c$, when a value of the cold airflow component changes, $\Delta T_c$ and $q_0$ change correspondingly, and there are maximum values of $\Delta T_c$ and $q_0$ in a range of $\mu_c$ from 0 to 1. In a case that $\mu_c$ ranges from 0.3 to 0.35, $\Delta T_c$ has the maximum value; in a case that $\mu_c$ ranges from 0.6 to 0.7, $q_0$ reaches the maximum value. Besides, the heating effect also changes with the change of $\mu_c$, $\Delta T_h$ continuously increases with the increase of $\mu_c$ without limitation.

As for the working pressure $p_1$ at the inlet of the jet pipe 102, when $p_1$ increases, both $\Delta T_c$ and $q_0$ increase. However, when $\Delta T_c$ and $q_0$ increases, the maximum value of $\Delta T_c$ moves in a direction in which $\mu_c$ decreases, and the maximum value of $q_0$ moves in a direction in which $\mu_c$ increases.

When the gas is moist, the water vapor in the cold airflow is condensed and heat is released, so a cooling temperature rises and the cooling efficiency decreases; a temperature rise of the hot airflow is reduced, and the heating effect is weakened.

The principle of the vortex flow separator 10 is described in detail above, the hot airflow and the cold airflow can be separated by the vortex flow separator 10. The cold airflow and the hot airflow are used as the airflow entering the sprayer in all the embodiments in the present application. Specifically, in the first embodiment, the cold airflow or the hot airflow separated by the vortex flow separator 10 is introduced into the annular spray pipe 20 mounted at the end face of the iron core 204. Certainly, the cold airflow or the hot airflow sprayed by the sprayer in the present embodiment and other following embodiments can also be provided by other equipment. For example, the cold airflow may be the internal circulation airflow as described in the background technology.

Referring to FIG. 10, the annular spray pipe 20 is provided with multiple airflow inlets. The cold airflow from the outlet of the cold end pipe section 101c of the vortex flow separator is conveyed to two of the multiple airflow inlets. The two airflow inlets are symmetrically arranged with respect to a circular center of the annular spray pipe 20, so that the entering of the air is more uniform and accordingly the spraying is more uniform. A first valve 1 and a second valve 2 are provided at the outlet of the cold end pipe section 101c (a left end of the vortex flow separator 10 in FIG. 10), to control blocking and unblocking of the two airflow inlets respectively.

The hot airflow from the outlet of the hot end pipe section 101b of the vortex flow separator (a right end of the vortex flow separator in FIG. 10) is also conveyed to two of the multiple airflow inlets, and the two airflow inlets are also symmetrically arranged with respect to the circular center of the annular spray pipe 20, so as to achieve the purpose of uniform entering and spraying of the air. A third valve 6 and a fourth valve 7 are provided at the outlet of the hot end pipe section 101c, to control blocking and unblocking of the two airflow inlets respectively. FIG. 10 also shows that throttling valves 3 and 4 can also be provided at the outlet of the hot end pipe section of the vortex flow separator 10 for flow regulation. The vortex flow separator 10 is further provided with a pipeline valve and a control device 5 thereof. If the airflow is required to be recycled, the airflow can be controlled by the control device.

It can be understood that, two airflow inlets for the cold airflow and two airflow inlets for the hot airflow are provided. In order to ensure the uniformity of the airflow spraying, more airflow inlets may be added. The airflow inlets may also not distinguished for introducing the cold airflow or the hot airflow, instead, when the cold airflow is required to be sprayed, the cold airflow can be introduced to the airflow inlet, and when the hot airflow is required, the hot airflow can be introduced to the airflow inlet.

Second Embodiment

Figure 18:
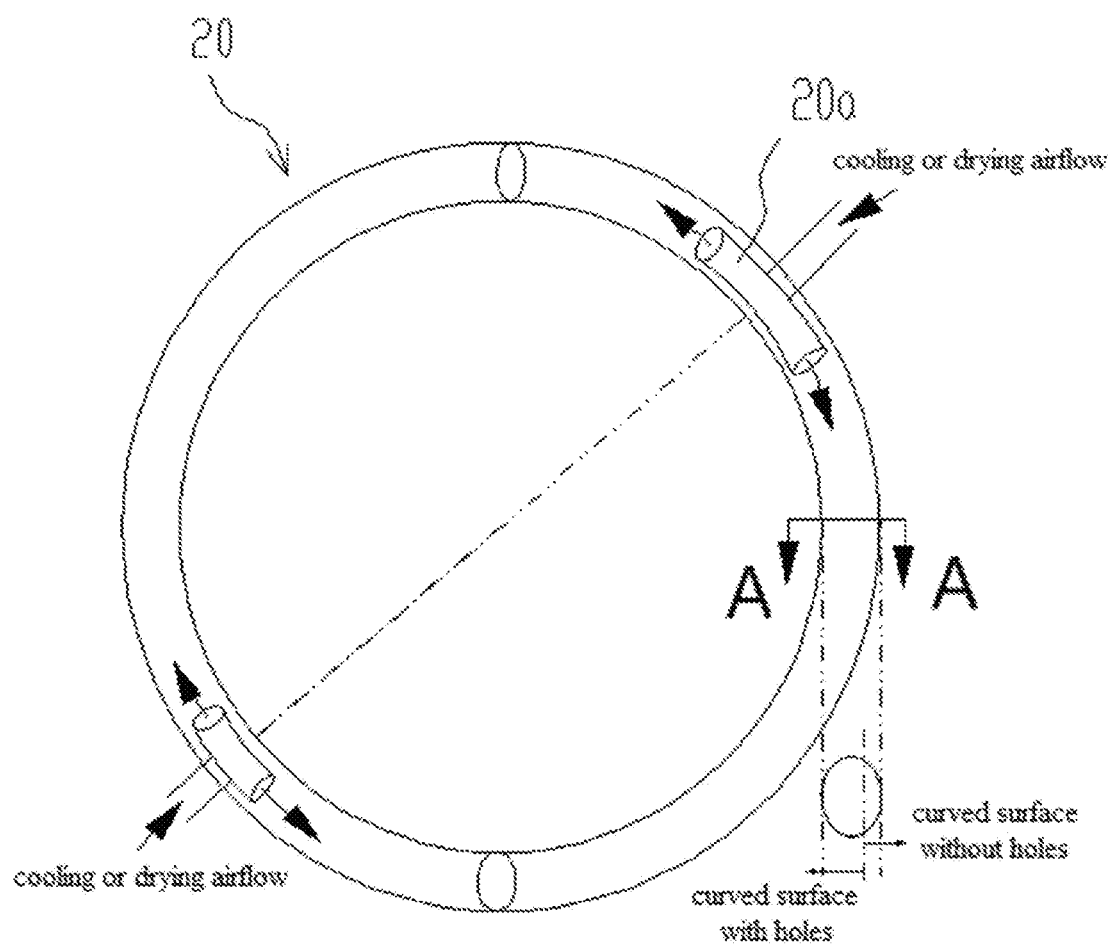
FIG. 18 is a schematic view showing the annular spray pipe in FIG. 17.
Figure 19:
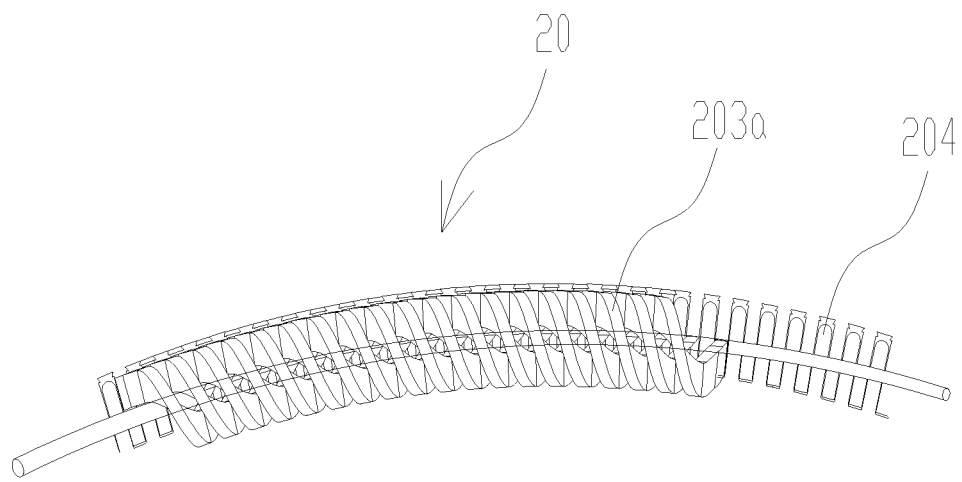
FIG. 19 is a schematic view showing that the annular spray pipe in FIG. 18 runs through a part of the winding end portions.

Referring to FIG. 17, FIG. 17 is a schematic view showing a heat exchange or drying device for an iron core 204 according to a second embodiment of the present application, an annular spray pipe 20 runs through a through hole at winding end portions 203a; FIG. 19 is a schematic view showing the annular spray pipe 20 in FIG. 17 runs through a part of the winding end portions 203a; and FIG. 18 is a schematic view of the annular spray pipe 20 in FIG. 17.

It can be seen from FIG. 17 that, windings 203 of the iron core 204 are bent at two ends of iron core 204 in an axial direction to form the winding end portions 203a. A sharp point of each of the winding end portions 203a is a winding nose. The through hole is formed at the winding end portions 203a due to the bending. Multiple winding end portions 203a are circumferentially distributed at an end portion of the iron core 204. A portion of a circumference is shown in FIG. 19, where the annular spray pipe 20 in FIG. 19 runs through the through hole formed in the winding end portions 203a. The windings 203 may function to support and mount the annular spray pipe 20. Of course, the annular spray pipe 20 may be only arranged to run through the through hole, and the annular spray pipe 20 is supported and mounted by other components.

The annular spray pipe 20 is provided with multiple spray holes along its circumferential direction, and the hot airflow output by the vortex flow separator 10 can be conveyed to the annular spray pipe 20, such that the hot airflow can flow out from the spray holes and is sprayed to the winding end portions 203a, to perform the cooling and drying function. The drying function is not only for drying the winding end portions 203a, but more importantly, a dry environment is created at the end portions of the windings 203. As shown in FIG. 17, after each of the windings 203 is placed in a slot 204b of the iron core 204, a slot wedge 206 is inserted in the axial direction, to prevent the winding 203 from being separated from the slot 204b radially. After an insulation impregnation process, insulating varnish is provided among the slot wedge 206, the slot 204b and the winding 203, to create a dry environment at the end portion of the winding 203, which is conducive to providing a dry environment for the insulating varnish at the end portion of the winding 203, and thus improving the insulation performance. That is, the hot airflow can be used for drying a junction between a root of the end portion of the winding 203 and the iron core 204.

Of course, the cold airflow produced by the vortex flow separator 10 may also be introduced into the annular spray pipe 20, to cool the end portions of the windings 203, which is beneficial to heat dissipation of the windings 203 and the iron core 204. The cooling airflow in the annular spray pipe 20 may come directly from the vortex flow separator 10 described in the first embodiment, or from other airflow supply devices as described above.

With continued reference to FIG. 18, a cross-sectional view of the annular spray pipe taken along line A-A is shown at a lower right portion in FIG. 18. It can be seen that an outer side of the annular spray pipe 20 is a curved surface without holes, that is, no spray holes is provided at the outer side, and the spray holes are located at an inner side and a middle portion of the annular spray pipe 20. After entering the annular spray pipe 20, the cold or hot airflow flows in the annular spray pipe 20 along an arc-shaped path, and a centrifugal force is generated. The spray holes are arranged at the inner side and the middle portion of the annular spray pipe 20, to prevent the airflow from directly rushing out from the outer side under the action of the centrifugal force, which is beneficial to uniform spray of the airflow in the circumferential direction. The arrangement of the spray holes herein is also applicable to the first embodiment.

Furthermore, an airflow dividing pipe 20a may be arranged inside the annular spray pipe 20. After entering the airflow dividing pipe 20a, the cold airflow or the hot airflow are sprayed from two ends of the airflow dividing pipe 20a. As shown in FIG. 19, the annular spray pipe 20 is specifically circular-shaped, and the vortex flow separation pipe 101 is an arc-shaped section matching with an inner chamber of the annular spray pipe 20. The airflow dividing pipe 20a is arranged at a position where an airflow inlet is located. In this way, after entering the airflow dividing pipe 20a, the cold airflow or the hot airflow is sprayed out of the two ends of the airflow dividing pipe 20a, and is sprayed along the circumferential direction of the annular spray pipe 20, which is beneficial to uniform spray of the cold airflow or the hot airflow after being sprayed from the annular spray pipe 20. Preferably, two or more airflow dividing pipes 20a may be provided, which corresponds to the number of the airflow inlets. FIG. 18 shows that two airflow dividing pipes 20a are symmetrically distributed along a center line of the annular spray pipe 20, which is also beneficial to uniform spray of the airflow. The arrangement of the airflow dividing pipe 20a herein is also applicable to the first embodiment.

Figure 20:
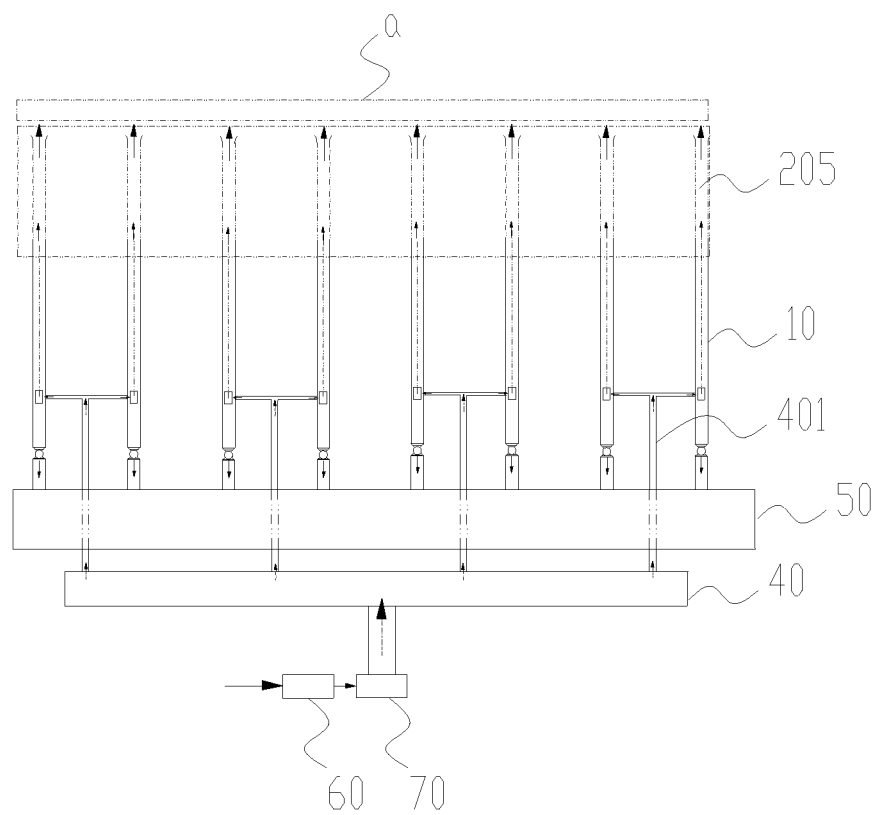
FIG. 20 is a schematic view showing an airflow supply device in FIG. 17.

With continued reference to FIG. 17 and in conjunction with FIG. 20, FIG. 20 is a schematic view showing an airflow supply device in FIG. 17.

Similar to the first embodiment, the cold airflow and the hot airflow may also be provided to the airflow supply device in the second embodiment by the vortex flow separator 10. In the second embodiment, a plurality of radial cooling passages 205 running through the iron core 204 are formed in the iron core 204. In this case, multiple vortex flow separators 10 may be arranged at an inner side of an iron core support 208. The cold airflow generated by the vortex flow separators 10 can be conveyed to the radial cooling passages 205 to further cool the iron core 204.

With continued reference to FIG. 20, the heat exchange or drying device includes an air collection tank 40 in which the airflow is converged. After being filtered by an air filter 60, the air is compressed by a compressor 70 and then conveyed to the air collection tank 40. The air collection tank 40 is provided with multiple branch pipes 401, each of the branch pipes is provided with the vortex flow separator 10, and the branch pipe 401 is configured to provide the airflow to the jet pipe 102 of the vortex flow separator 10. In this way, the compressor 70 can provide the compressed air to the multiple vortex flow separators 10, which simplifies the structure. In addition, by providing the multiple vortex flow separators 10, the cooling airflow can be supplied to the multiple radial cooling passages 205, and thereby improving the cooling effect.

In FIG. 17, only one vortex flow separator 10 at a section in the axial direction is shown. It can be seen that, in a case that the iron core 204 is provided with multiple radial cooling passages 205 distributed both axially and circumferentially, the vortex flow separators 10 may be arranged in a manner that multiple rows of the vortex flow separators 10 (a row of the vortex flow separators 10 arranged axially is shown in FIG. 17) are distributed in the circumferential direction of the iron core 204.

Each of the branch pipes 401 may be provided with two vortex flow separators 10. One branch pipe 401 supplies the airflow to the jet pipes 102 of the two vortex flow separators 10 at the same time, and the two vortex flow separators 10 supply the cooling airflow to the adjacent two cooling passages 205. As shown in FIG. 20, the air collection tank 40 is provided with a row of branch pipes 401 distributed axially, each of the branch pipes 401 is in communication with two axially adjacent vortex flow separators 10, and the jet pipes 102 of the two vortex flow separators 10 are integrally formed with the branch pipe 401. Of course, the jet pipes 102 of the two vortex flow separators 10 and the branch pipe 401 may also be separately formed and then connected by connectors. In this way, the air collection tank 40 can be provided with multiple rows of branch pipes 401 distributed circumferentially, so as to form supply points of the cold airflow in the circumferential direction and the axial direction of the iron core 204. Of course, it is feasible that one branch pipe 401 supplies the airflow to the two circumferentially adjacent vortex flow separators 10. In addition, one branch pipe 401 may also supply compressed airflow to more than two vortex flow separators 10, which is not limited.

The cold end pipe section 101c of vortex flow separation pipe 101 of the vortex flow separator 10 can be inserted into the radial cooling passage 205 of the iron core 204, for example, by means of shrink fit. The cold end pipe section 101c is cooled and then inserted into the radial cooling passage 205 to be tightly pressed by expansion; or, the cold end 101d of the cold end pipe section 101c may be welded to the radial cooling passage 205; or, a connector may be welded to the radial cooling passage 205 or connected to the radial cooling passage 205 by shrink fit, and the cold end 101d of the vortex flow separation pipe 101 is connected to and in communication with the connector, as long as the cold airflow at the cold end 101d can be conveyed into the radial cooling passage 205 (or be introduced to a confluence pipe tank and a confluence main pipe, and then be distributed into the radial cooling passage 205). The specific manner is not limited in this solution.

As shown in FIG. 17, in addition to providing the cold airflow to the radial cooling passage 205 by the vortex flow separator 10, the cold airflow or the hot airflow generated by the vortex flow separator 10 may also be introduced into the annular spray pipe 20, to cool and dry the position at the end portion of the iron core 204. As shown in FIG. 17, in the axial direction, the cold end pipe sections 101c of the vortex flow separators 10 at two ends of the row of vortex flow separators 10 are connected to the annular spray pipe 20 through a connecting pipe 20b.

In FIG. 17, a second iron core fastener 207 configured for connecting the iron core 204 and the iron core support 208 is provided. The second iron core fastener 207 may be provided with a through hole. The cold end pipe section 101c of the vortex flow separator 10 in FIG. 20 may also be inserted into the second iron core fastener 207, to spray the cooling airflow to the surface of the iron core 204.

The hot airflow separated by the vortex flow separator 10 can be gathered in a hot airflow confluence box 50. In addition to being conveyed to the annular spray pipe 20, the hot airflow may also be used to dry two sides of spaces of other air gaps (such as protective coating of the permanent magnetic pole at the rotor side and the insulating varnish on a stator surface) inside the generator 200 when the wind turbine is stopped. In a case that the drying is performed when the wind turbine is stopped, the hot airflow will not increase a thermal load of the generator.

The second embodiment is substantially the same as the first embodiment, and the arrangement and the communication manner of the vortex flow separator 10 in the second embodiment is applicable to the first embodiment. The annular spray pipe 20 of the second embodiment runs through the winding end portions 203a, in this way, a structure for fixing the annular spray pipe 20 can be omitted, which simplifies the mounting and can be better targeted at establishing a dry environment for the winding end portions 203a. Of course, the annular spray pipe 20 is arranged at the end portion of the iron core 204, which is not limited to running through the winding end portions 203a or being fixed on an end face of the iron core 204. For example, the annular spray pipe 20 may also be fastened to an inner side of the iron core 204, as long as the cold airflow or the hot airflow can be sprayed to the end portion of the iron core 204. Although the position where the annular spray pipe 20 is located is not limited, the two arrangements provided by the first embodiment and the second embodiment are convenient for the mounting of the annular spray pipe 20.

Third Embodiment

Figure 21:
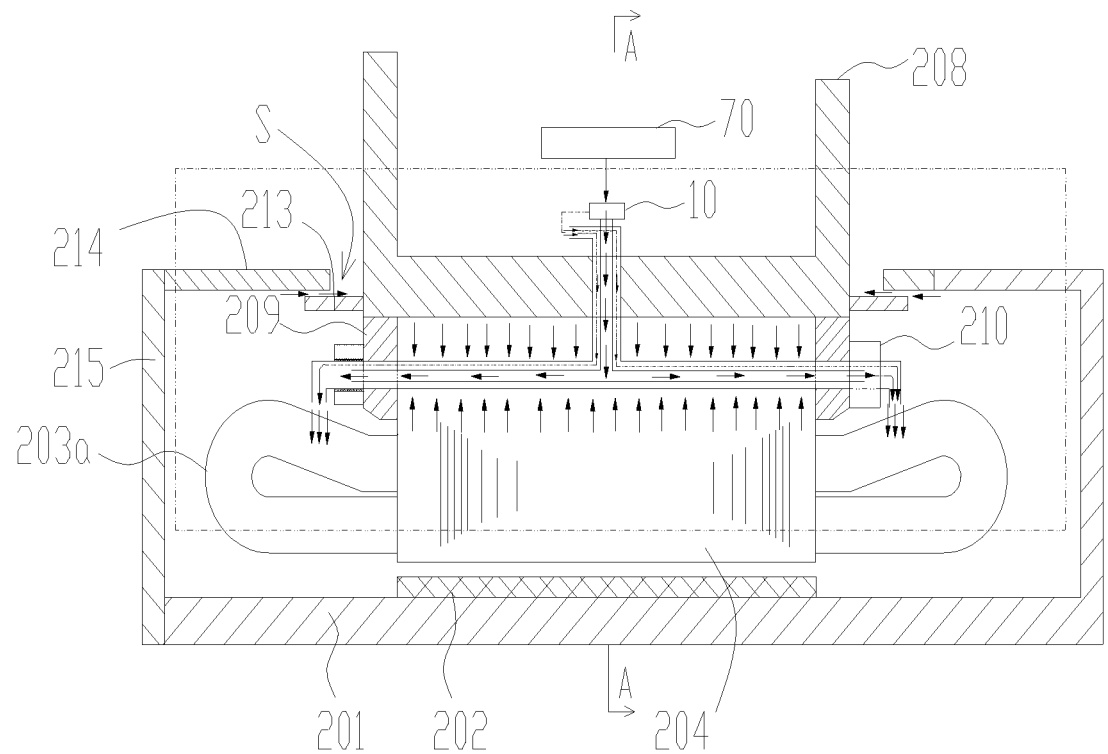
FIG. 21 is a schematic view showing a heat exchange or drying device for an iron core according to a third embodiment of the present application.
Figure 22:
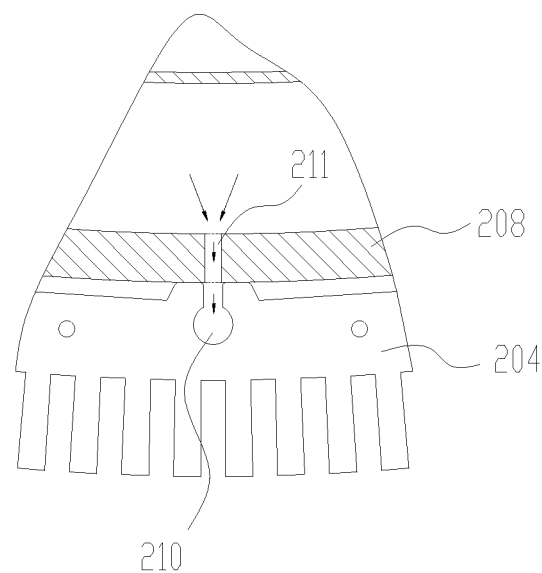
FIG. 22 is a view taken along line A-A in FIG. 21.
Figure 23:
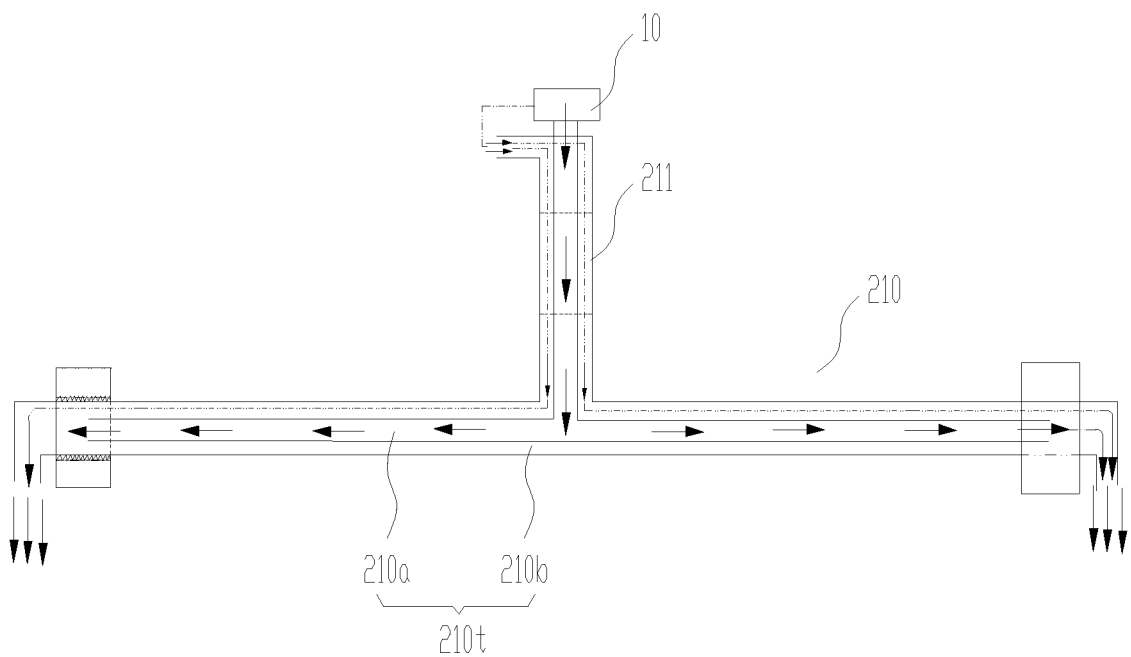
FIG. 23 is a sectional view showing a first iron core fastener in FIG. 21.
Figure 24:
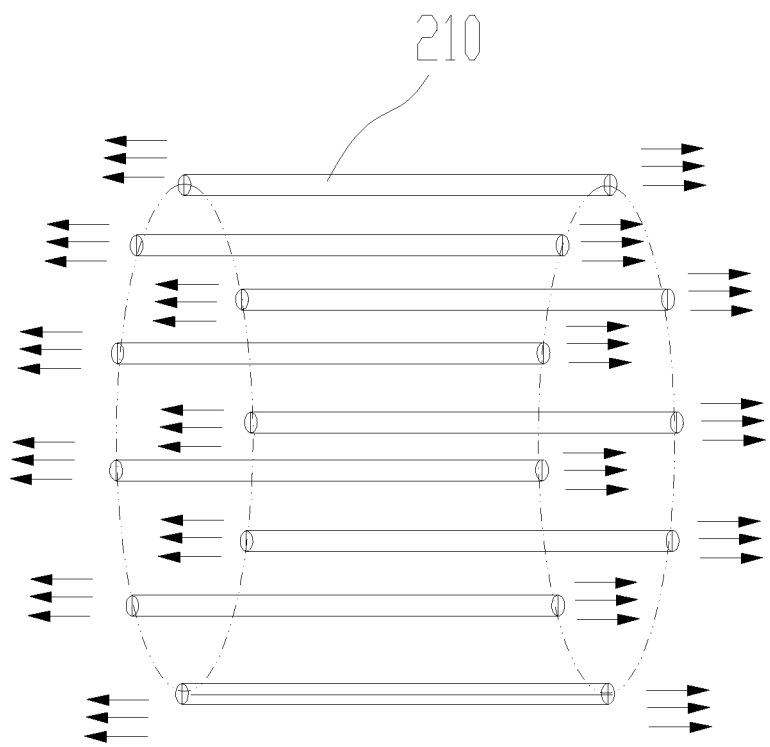
FIG. 24 is a schematic view showing a principle of airflow spray formed by multiple first iron core fasteners.

Referring to FIGS. 21 to 23, FIG. 21 is a schematic view showing a heat exchange or drying device for an iron core 204 according to a third embodiment of the present application; FIG. 22 is a view taken along line A-A in FIG. 21; FIG. 23 is a sectional view showing a first iron core fastener 210 in FIG. 21; and FIG. 24 is a schematic view showing a principle of airflow spray formed by multiple first iron core fasteners.

As shown in the above embodiments, the iron core 204 is generally formed by superposing multiple stacking sheets in the axial direction. In order to ensure the reliability of the superposing of the stacking sheet, multiple first iron core fasteners 210 for axially tensioning the iron core 204 are provided. For example, the first iron core fastener 210 may be a stud bolt in FIG. 21. As shown in FIG. 21, the iron core support 208 is fixed with tooth pressing plates 209, and the tooth pressing plates 209 are located at outer surfaces of the stacking sheets at two ends of the iron core 204 in the axial direction. The first iron core fastener 210 axially runs through the tooth pressing plates 209, end portions of the first iron core fastener 210 is screwed by nuts, so as to tension the multiple superposed stacking sheets.

In this embodiment, the first iron core fastener 210 also serves as a sprayer, and a spray hole is arranged in the first iron core fastener 210. As shown in FIG. 21, two ends of the first iron core fastener 210 extend out of the end portions of the iron core 204, that is, run through stacking sheets at an outermost layer. In this case, the spray hole is located at the end portion of the first iron core fastener 210. As long as the airflow can be conveyed to the end portion of the first iron core fastener 210, the airflow can be sprayed at the end portion of the iron core 204.

Specifically, as shown in FIG. 23, the first iron core fastener 210 is provided with an airflow passage 210t extending in the axial direction and running through the two end portions thereof. The airflow enters into the airflow passage 210t from the outside and is sprayed outward from two ends of the airflow passage 210t. In this case, end portions, capable of spraying the airflow, of the airflow passage 210t are spray holes of the sprayer. In a case that the first iron core fastener 210 is the stud bolt shown in FIG. 21, the airflow passage 210t runs through the stud bolt, and the spray holes are portions of the airflow passage 210t located at bolt heads of the stud bolt.

In this embodiment, the airflow supply device is provided at an inner side of the iron core support 208, and a side wall passage 211 is further provided. The side wall passage 211 successively runs through the iron core support 208, gets into the iron core 204, and runs through a side wall of the first iron core fastener 210, and then is in communication with the airflow passage 210t. In this way, the airflow supply device located at the inner side of the iron core support 208 generates the required airflow, the airflow may enter into the airflow passage 210t through the side wall passage 211, and then is sprayed from the two ends of the airflow passage 210t. The airflow supply device herein may also be the vortex flow separator 10 described above, and the specific structure of the vortex flow separator 10 can be understood with reference to the above embodiments, which is not described herein. In this embodiment, the first iron core fastener 210 of the iron core 204 is skillfully used to form an airflow conveying passage, there is no need to arrange a special airflow conveying passage, and operations such the fastening of the passage is also not needed, which is more convenient. In addition, the airflow supply device can be arranged at the inner side of the iron core support 208 in this way. The inner side of the iron core support 208 has relatively sufficient space, which facilitates the arrangement of the airflow supply device.

With continued reference to FIG. 24, the cold airflow or the hot airflow is sprayed from the two end portions of the first iron core fastener 210. The end portions of the first iron core fastener 210 are located at end faces of the iron core 204. In this way, a relatively uniform spraying airflow may be formed at the end faces of the iron core 204, which can better perform cooling and drying.

With continued reference to FIG. 23, in this embodiment, the airflow passage 210t includes a first passage 210a and a second passage 210b isolated from each other. The first passage 210a is configured to introduce the cold airflow, and the second passage 210b is configured to introduce the hot airflow. Specifically, a T-shaped pipe may be inserted into the airflow passage 210t and the side wall passage 211. A horizontal pipe section of the T-shaped pipe is located in the airflow passage 210t to form the first passage 210a, and a space between the horizontal pipe section of the T-shaped pipe and an inner wall of the airflow passage 210t forms the second passage 210b. Correspondingly, the side wall passage 211 is also divided into two portions by a vertical pipe section of the T-shaped pipe. One portion is a pipe chamber of the vertical pipe section, which is configured to convey the cold airflow to the first passage 210a. A space between the vertical pipe section and an inner wall of the side wall passage 211 is configured to convey the hot airflow to the second passage 210b. Apparently, it is also feasible the hot airflow is conveyed to the first passage 210a while the cold airflow is conveyed to the second passage 210b. It is also feasible that the first passage 210a and the second passage 210b are arranged separately by other means, or the two passages are formed by isolation through a partition plate.

As shown in FIG. 21, in a case that the airflow supply device is the vortex flow separator 10, a cold airflow outlet thereof may be in communication with the first passage 210a, and a hot airflow outlet may be in communication with the second passage 210b. In this way, the cold airflow or the hot airflow can be selected to be introduced according to needs by controlling the vortex flow separator 10 to be in communication with the first passage 210a or the second passage 210b. Certainly, in a case that there is only one passage in both the airflow passage 210t and the side wall passage 211, a switching valve is provided to allow the hot end pipe section 101b or the cold end pipe section 101c of the vortex flow separator 10 to be in communication with the side wall passage 11 and the airflow passage 210t.

In this embodiment, the airflow is sprayed out of the two ends of the first iron core fastener 210, to perform heat exchange at the end portions of the iron core 204, so as to achieve the purpose of cooling and drying. After the heat exchange, the airflow flows inside the rotor, and when a certain amount of airflow is accumulated, the airflow can flow out from a clearance s shown in FIG. 21. The clearance s is an annular clearance and is located at a clearance between the generator 200 and the iron core support 208, and spiral teeth sealing can be provided herein. Specifically, a magnetic yoke 201 is connected to a cylindrical rotor end cover 215, and an end cover seal ring 214 is provided at an edge of the rotor end cover 215. An annular enclosing plate 213 is provided at each of two ends of the iron core support 208, and the spiral tooth sealing is provided between the enclosing plate 213 and the end cover seal ring 214. In this case, the annular clearance s will be formed between the end cover seal ring 214 and the enclosing plate 213. The hot airflow is the dry air which can perform mass transfer and drying on the surface. When flowing out from the clearance s, the hot airflow can resist a gas-liquid two-phase flow or a gas-solid two-phase flow from an upwind direction. Moreover, the moist air formed after performing the drying function is squeezed out from the clearance s, which maintains the dry environment inside the generator 200. In the above first and second embodiments, the airflow sprayed from the annular sprayer 20 can also be squeezed out from the clearances.

Fourth Embodiment

Figure 25:
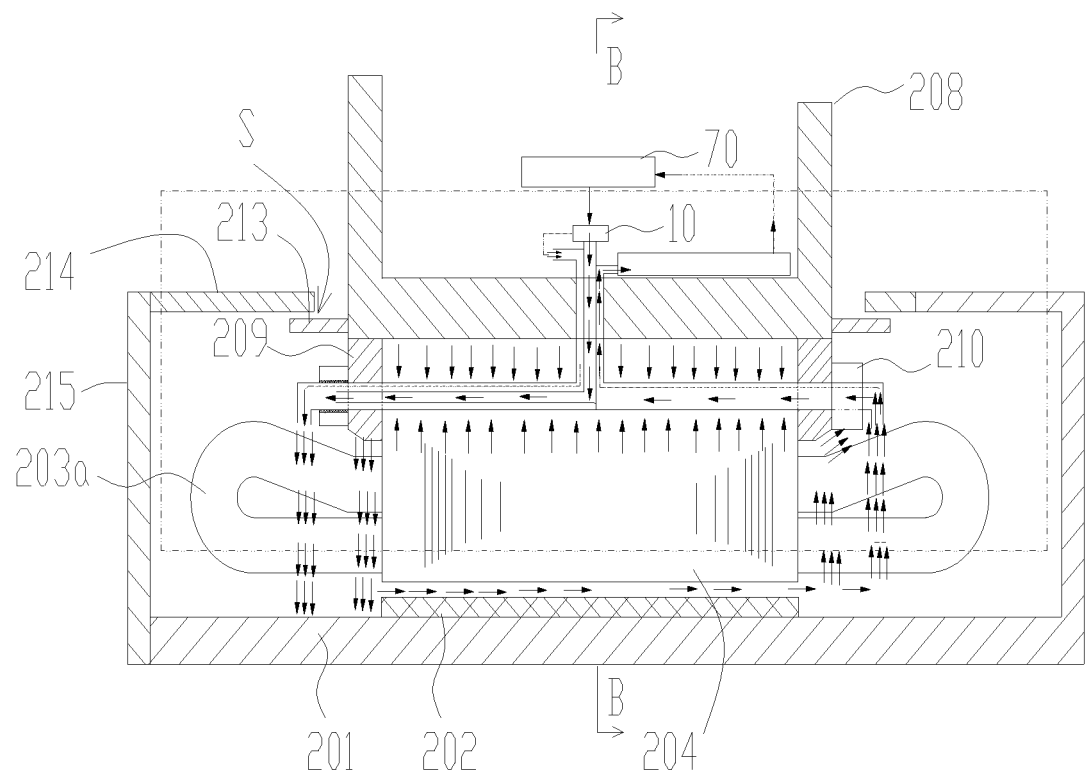
FIG. 25 is a schematic view showing a heat exchange or drying device for an iron core according to a fourth embodiment of the present application.
Figure 26:
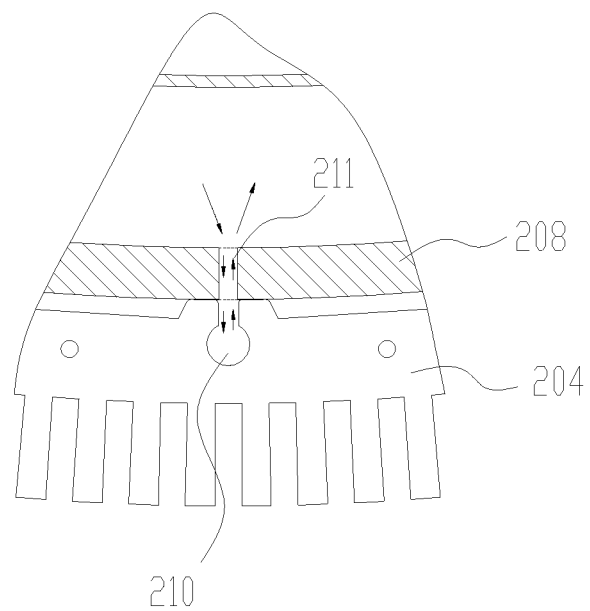
FIG. 26 is a view taken along line B-B in FIG. 25.
Figure 27:
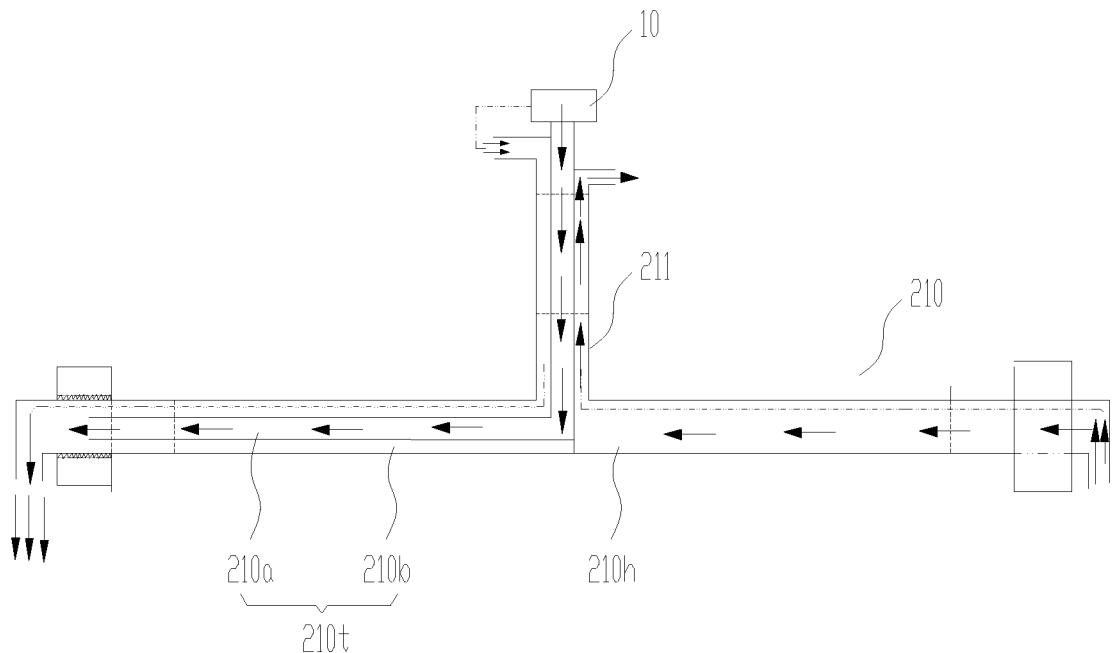
FIG. 27 is a sectional view showing the first iron core fastener in FIG. 24.
Figure 28:
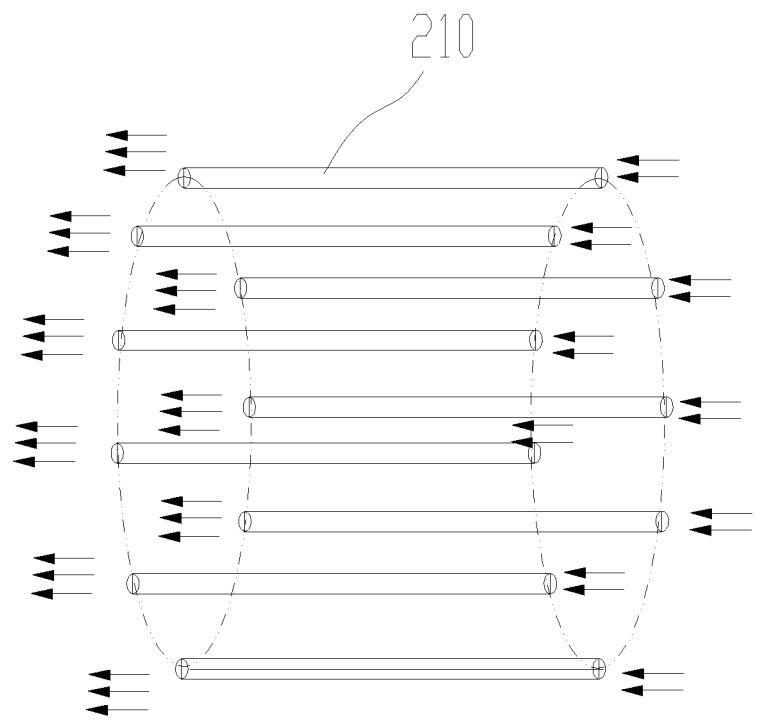
FIG. 28 is a schematic view showing a principle of airflow spray formed by multiple first iron core fasteners.

Referring to FIGS. 25 to 27, FIG. 25 is a schematic view showing a heat exchange or drying device of for an iron core provided according to a fourth embodiment of the present application; FIG. 26 is a view taken along line B-B in FIG. 25; FIG. 27 is a sectional view showing a first iron core fastener in FIG. 24; and FIG. 28 is a schematic view showing a principle of the airflow spray formed by multiple first iron core fasteners 210.

This embodiment is substantially the same as the third embodiment, except that in the third embodiment, the airflow enters into the airflow passage 210t and is sprayed out from the two ends thereof, and in the fourth embodiment, the airflow is sprayed from one end, and a recovery passage 210h is further provided.

As shown in FIG. 25, the airflow passage 210t only runs through one end of the first iron core fastener 210, and the recovery passage 210h runs through the other end of the first iron core fastener 210. According to FIG. 25, the airflow passage 210t and the recovery passage 210h are in the same passage, but they are isolated from each other. Certainly, since the airflow passage 210t and the recovery passage 210h are not in communication with each other, they may be two completely independent passages, and only one end of each of the two passages is unblocked, which is a blind hole structure.

In this case, the side wall passage 211 also includes an inlet passage and an outlet passage isolated from each other. The airflow enters into the airflow passage 210t from the inlet passage and is sprayed out from an end portion of the airflow passage 210t. In FIG. 25, the airflow is sprayed out from a left end. The sprayed airflow performs heat exchange outside (at the end portion of the iron core 204 and an inner chamber between the magnetic yoke 201 and the iron core support 208) and then enters from an end portion of the recovery passage 210h, and flows out through the recovery passage 210h and the outlet passage to be recycled. The inlet passage and the outlet passage of the side wall passage 211 may be two portions of the same passage which are isolated with each other, or may be two completely independent passages.

For the airflow passage 210t, the first passage 210a and the second passage 210b may be formed by dividing the airflow passage 210t, to introduce the cold airflow and the hot airflow respectively. In FIG. 27, it is equivalent that an L-shaped pipe is inserted into the airflow passage 210t and the inlet passage of the side wall passage 211. The first passage 210a is formed by a pipe chamber of a horizontal pipe section of the L-shaped pipe, and the second passage 210b is formed by a space between the horizontal pipe section and an inner wall of the airflow passage 210t. A vertical pipe section of the L-shaped pipe is located in the inlet passage of the side wall passage 211 for introducing the cold airflow. The space between the vertical pipe section and the inlet passage is configured for introducing the hot airflow. Certainly, it is also feasible the hot airflow is conveyed to the first passage 210*a* while the cold airflow is conveyed to the second passage 210*b*. It is also feasible that the first passage 210*a* and the second passage 210*b* are arranged separately by other means, or the two passages are formed by isolation through a partition plate.

With this arrangement, after the airflow is sprayed from one end of the airflow passage 210*t*, the heat exchange is performed near the end and the cooling and/or drying functions are realized, when the airflow is accumulated to a certain amount, the airflow will flow from an air gap a between the iron core 204 and a magnetic pole 202 to the other end of the first iron core fastener 210, to perform exchange heat at the other end and enter into the recovery passage 210*h* at the other end of the first iron core fastener 210, and then flows out from the side wall passage 211. The airflow flowing out can be recycled. For example, after performing heat exchange and being heated, the cold airflow may be used for drying, or may also be conveyed back to the compressor 70, or may be conveyed to other places required to be dried. Certainly, in this embodiment, in a case that there is a certain clearance s, part of the airflow may also flow out from the clearance s, which has the same function as that of the third embodiment. In a case that the sealing performance is better, the recovery effect is more significant.

In the above embodiments, the heat exchange or drying device for the iron core 204 is illustrated mainly by taking the generator 200 as an example. It can be understood that, in addition to the generator 200, the above solutions may be applicable to other electromagnetic devices having the iron core 204, such as a motor, a transformer and an electric reactor.

In a case that the generator 200 is applied to a wind turbine, the hot airflow separated by the vortex flow separator 10 or the recovered temperature-rised airflow may be conveyed to at least one of the following: a front edge of a blade, a rear edge of the blade, a hub, a pitch bearing, a wind measurement support at an upper portion of a nacelle and a yaw bearing. The yaw bearing is arranged between the generator 200 and the nacelle. The hot airflow may be conveyed to the inner front edge of the blade and the rear edge of the blade, to prevent the blade from icing and frosting. Specifically, the hot airflow may be conveyed to an inner chamber close to the front edge inside the blade or an outside of the blade, or an inner chamber close to the rear edge inside the blade or the outside of the blade. The hot airflow is also conveyed to the wind measurement support at the upper portion of the nacelle, which can perform the drying function, thereby maintaining the detection sensitivity of the wind measurement support. In a case that the wind turbine 200 is not working, the hot airflow may be conveyed to an exposed surface of the pitch bearing, an interior of the yaw bearing, a space inside the hub or other parts, to perform the drying function, and the thermal load will not be increased. When the hot airflow is conveyed to the space inside the hub, a gas slip ring may be provided. It can be seen that the generator 200 is not provided with the heat source and the cold source at the same time, a single device has a dual function of the cold source and the heat source at the same time, which is both the cold source and the heat source.

In the above embodiments, the sprayer is mainly provided to spray the cold airflow or the hot airflow at the end portion of the iron core 204, that is, the cold source and the drying source are generated in the heat source (the iron core 204 and the windings 203) to cool and dry the insulation of the windings 203 and the iron core 204, so as to create a cool and dry environment at the end portion of the iron core 204, which is conducive to the heat dissipation of the iron core and the maintenance of the insulation performance of end portion of the windings 203, including the insulation of the windings 203 itself and the insulation between the windings 203 and the iron core 204, and is also conducive to the protection of the magnetic poles 202 and the protective coating thereof. The essence of the cooling and drying method is that the internal airflow will not be affected by natural environment and will not carry multiphase airflow in natural environment, which improves the internal environment, and the internal moist airflow can be squeezed or carried out to be recycled.

It can be understood that the solution of the sprayer may be carried out individually or combined with the cooling solutions described in the background technology, or as described above, multichannel cooling may be carried out by combining the radial cooling passage 205 and the cooling passage of the second fastener 207. The solutions of the annular spray pipe 20 (the first embodiment or the second embodiment) of the sprayer and the first fastener 210 (the third embodiment or the fourth embodiment) may also be performed collaboratively, to establish a multi-dimensional heat dissipation channel, so as to better perform the cooling and drying function.

It should be noted that, in the third and fourth embodiments, the airflow is conveyed through the first iron core fastener 210. When the cold airflow is conveyed, in addition to creating a cooling environment at the end portion of the iron core 204, the more important is that it is equivalent to arranging a cooling passage inside the iron core 204, and thus the iron core 204 can be better cooled.

The above embodiments are only preferred embodiments of the present application. It should be noted that, for those skilled in the art, a few of modifications and improvements may be made to the present application without departing from the principle of the present application, and these modifications and improvements are also deemed to fall into the scope of the present application defined by the claims.

The invention claimed is:

1. A heat exchange or drying device for an iron core, comprising:
   a sprayer configured to introduce airflow,
   wherein the sprayer is provided with spray holes, and the airflow is allowed to be sprayed to an end portion of the iron core through the spray holes, and
   wherein the sprayer comprises an annular spray pipe matching with an annular shape of the iron core, the annular spray pipe is provided at the end portion of the iron core, and the spray holes are provided in a circumferential direction of the annular spray pipe.

2. The heat exchange or drying device according to claim 1, wherein the annular spray pipe is mounted at the end face of the iron core.

3. The heat exchange or drying device according to claim 2, wherein:
   windings are accommodated in slots of the iron core, the end face of the iron core is provided with an annular busbar, and connectors of the windings are connected to the busbar; and
   the annular spray pipe is located at an inner side or an outer side of the busbar or is arranged to axially face the busbar directly, and the annular spray pipe is configured to spray the airflow to the busbar.

4. The heat exchange or drying device according to claim 1, wherein windings are accommodated in slots of the iron core, the windings are wound at the end portion of the iron core to form winding end portions, and the annular spray pipe is inserted into a through hole formed by all the winding end portions at the end portion of the iron core.

5. The heat exchange or drying device according to claim 1, wherein:
two or more airflow inlets are evenly distributed at the annular spray pipe in the circumferential direction, and the airflow inlets are configured for introducing the airflow; and
an airflow dividing pipe is arranged inside the annular spray pipe at a position corresponding to one of the airflow inlets, the introduced airflow is allowed to enter into the airflow dividing pipe first, and the airflow dividing pipe is configured to spray the airflow from two ends, to guide the airflow to flow in the circumferential direction of the annular spray pipe and then be sprayed out from the spray holes.

6. The heat exchange or drying device according to claim 1, wherein:
the spray holes are provided at an inner side of the annular spray pipe or both the inner side and an intermediate portion of the annular spray pipe, and no spray hole is provided at and an outer side of the annular spray pipe; and
the spray holes are configured to spray in at least one of a radial direction or an axial direction of the iron core.

7. An electromagnetic device, comprising:
an iron core;
a heat exchange or drying device, comprising:
a sprayer configured to introduce airflow,
wherein the sprayer is provided with spray holes, and the airflow is allowed to be sprayed to an end portion of the iron core through the spray holes, and
wherein the sprayer comprises an annular spray pipe matching with an annular shape of the iron core, the annular spray pipe is provided at the end portion of the iron core, and the spray holes are provided in a circumferential direction of the annular spray pipe.

8. The electromagnetic device according to claim 7, wherein the annular spray pipe is mounted at the end face of the iron core.

9. The electromagnetic device according to claim 8, wherein:
windings are accommodated in slots of the iron core, the end face of the iron core is provided with an annular busbar, and connectors of the windings are connected to the busbar; and
the annular spray pipe is located at an inner side or an outer side of the busbar or is arranged to axially face the busbar directly, and the annular spray pipe is configured to spray the airflow to the busbar.

10. The electromagnetic device according to claim 7, wherein windings are accommodated in slots of the iron core, the windings are wound at the end portion of the iron core to form winding end portions, and the annular spray pipe is inserted into a through hole formed by all the winding end portions at the end portion of the iron core.

11. The electromagnetic device according to claim 7, wherein:
two or more airflow inlets are evenly distributed at the annular spray pipe in the circumferential direction, and the airflow inlets are configured for introducing the airflow; and an airflow dividing pipe is arranged inside the annular spray pipe at a position corresponding to one of the airflow inlets, the introduced airflow is allowed to enter into the airflow dividing pipe first, and the airflow dividing pipe is configured to spray the airflow from two ends, to guide the airflow to flow in the circumferential direction of the annular spray pipe and then be sprayed out from the spray holes.

12. The electromagnetic device according to claim 7, wherein:
the spray holes are provided at an inner side of the annular spray pipe or both the inner side and an intermediate portion of the annular spray pipe, and no spray hole is provided at and an outer side of the annular spray pipe; and
the spray holes are configured to spray in at least one of a radial direction or an axial direction of the iron core.

13. A wind turbine, comprising:
a generator, comprising:
a stator;
an iron core associated with the stator; and
a heat exchange or drying device, comprising:
a sprayer configured to introduce airflow,
wherein the sprayer is provided with spray holes, and the airflow is allowed to be sprayed to an end portion of the iron core through the spray holes, and
wherein the sprayer comprises an annular spray pine matching with an annular shape of the iron core, the annular spray pipe is provided at the end portion of the iron core, and the spray holes are provided in a circumferential direction of the annular spray pine.

14. The wind turbine according to claim 13, wherein the annular spray pipe is mounted at the end face of the iron core.

15. The wind turbine according to claim 14, wherein:
windings are accommodated in slots of the iron core, the end face of the iron core is provided with an annular busbar, and connectors of the windings are connected to the busbar; and
the annular spray pipe is located at an inner side or an outer side of the busbar or is arranged to axially face the busbar directly, and the annular spray pipe is configured to spray the airflow to the busbar.

16. The wind turbine according to claim 13, wherein windings are accommodated in slots of the iron core, the windings are wound at the end portion of the iron core to form winding end portions, and the annular spray pipe is inserted into a through hole formed by all the winding end portions at the end portion of the iron core.

17. The wind turbine according to claim 13, wherein:
two or more airflow inlets are evenly distributed at the annular spray pipe in the circumferential direction, and the airflow inlets are configured for introducing the airflow; and
an airflow dividing pipe is arranged inside the annular spray pipe at a position corresponding to one of the airflow inlets, the introduced airflow is allowed to enter into the airflow dividing pipe first, and the airflow dividing pipe is configured to spray the airflow from two ends, to guide the airflow to flow in the circumferential direction of the annular spray pipe and then be sprayed out from the spray holes.

18. The wind turbine according to claim 13, wherein:
the spray holes are provided at an inner side of the annular spray pipe or both the inner side and an intermediate portion of the annular spray pipe, and no spray hole is provided at and an outer side of the annular spray pipe; and the spray holes are configured to spray in at least one of a radial direction or an axial direction of the iron core.

* * * * *